June 6, 1961 V. H. PAVLECKA 2,986,882
SUB-ATMOSPHERIC GAS TURBINE CIRCUITS
Filed June 27, 1955 5 Sheets-Sheet 1

INVENTOR.
VLADIMIR H. PAVLECKA
BY
Nicholas T. Vohs
ATTORNEY.

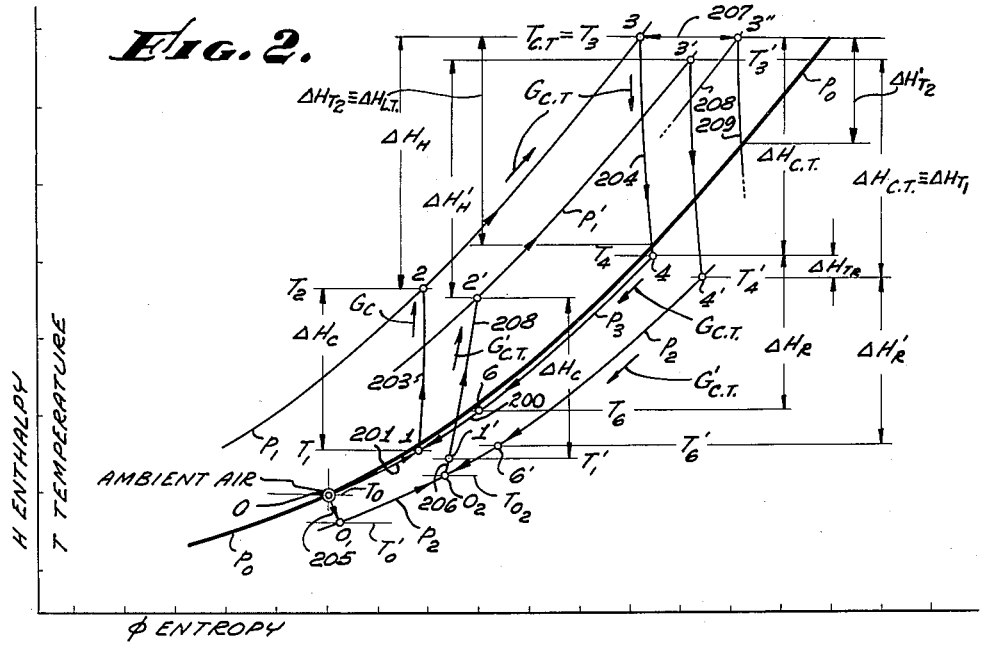

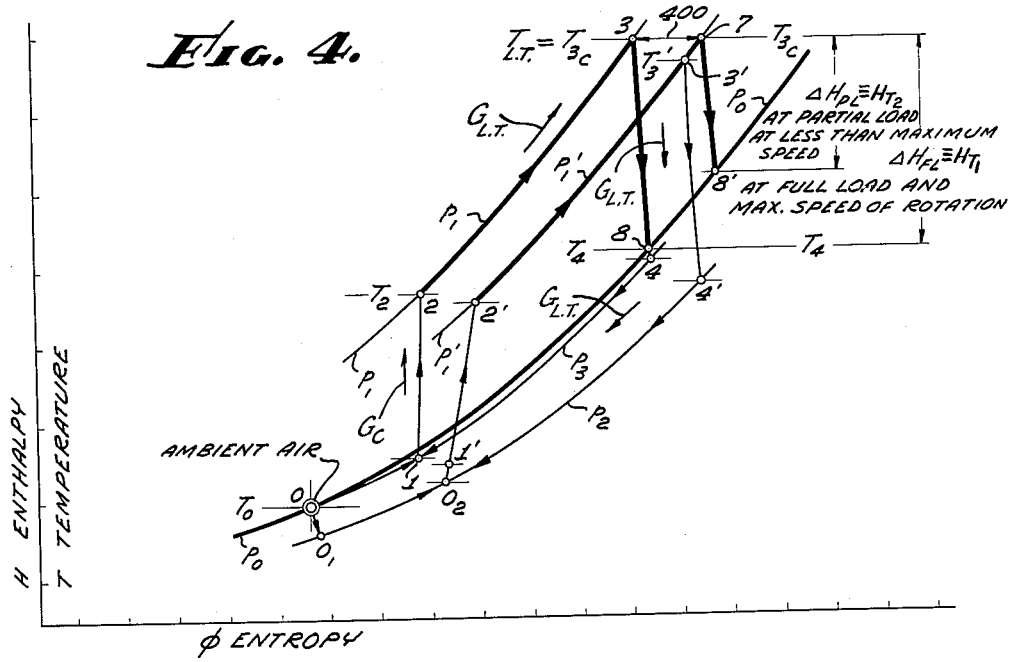
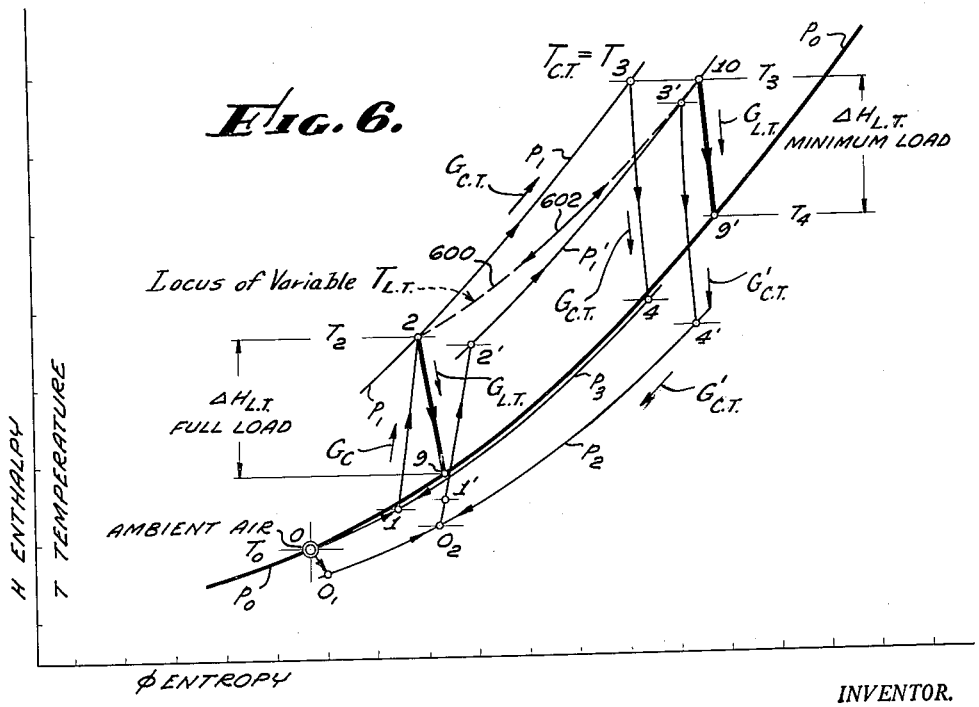

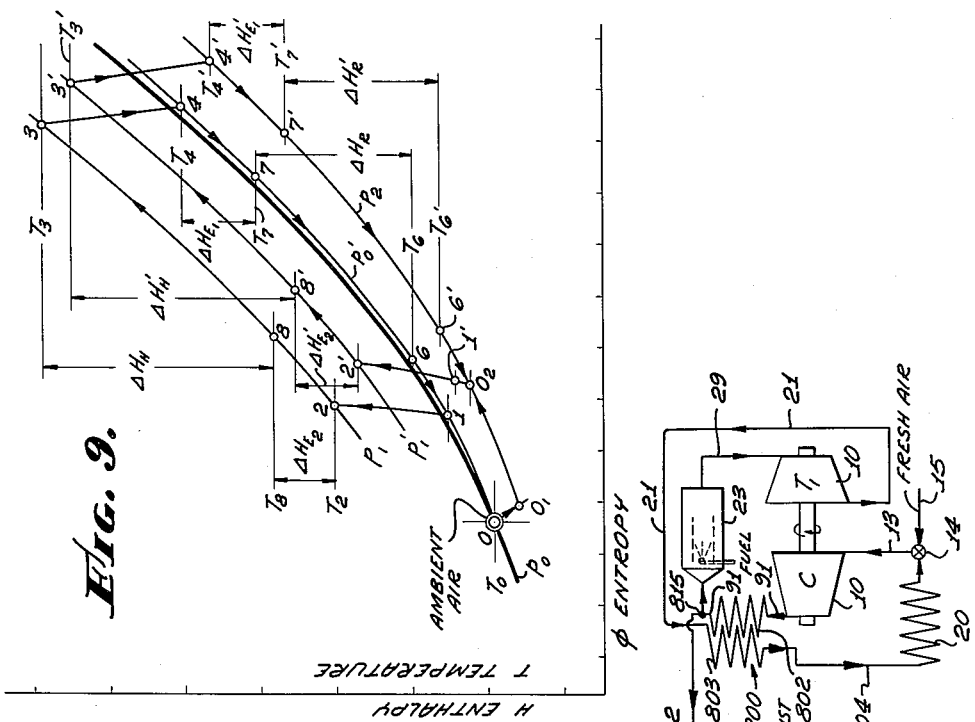
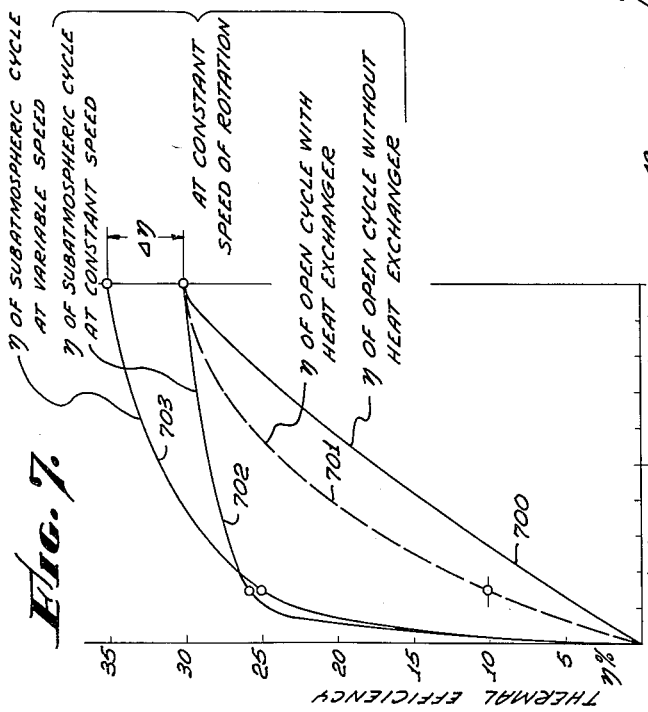

June 6, 1961 V. H. PAVLECKA 2,986,882
SUB-ATMOSPHERIC GAS TURBINE CIRCUITS
Filed June 27, 1955 5 Sheets-Sheet 5
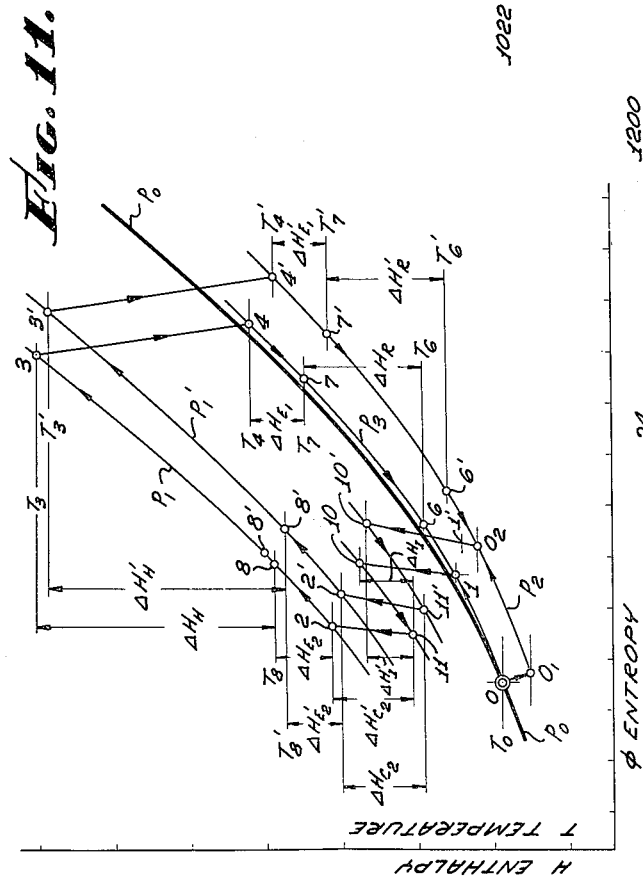
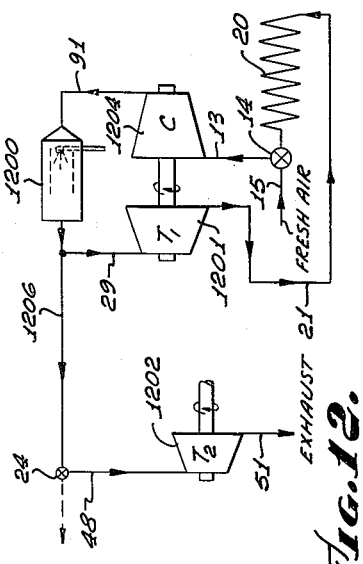
INVENTOR.
VLADIMIR H. PAVLECKA
BY
Nicholas T. Volpe
ATTORNEY.

United States Patent Office 2,986,882
Patented June 6, 1961

2,986,882
SUB-ATMOSPHERIC GAS TURBINE CIRCUITS
Vladimir H. Pavlecka, 1176 Monument St.,
Pacific Palisades, Calif.
Filed June 27, 1955, Ser. No. 518,091
21 Claims. (Cl. 60—39.15)

This invention relates to gas turbine power plants and more particularly to the thermodynamic cycles for gas turbine power plants operated at variable load, and the methods of operation of such plants at variable density of the working fluid in response to the variation in external load, the density of the working fluid being varied as a direct function of the external load.

A number of cycles have been proposed for use in connection with gas turbines. The simplest one is the open cycle where compressor, combustion chamber and turbine are connected in series and there is no heat recuperator. The thermodynamic cycle of such circuit has a large number of inherent disadvantages. Its efficiency at part load is quite low because the part load operation is obtained merely by varying the amount of fuel supplied to the combustion chamber with the concomitant drop in the maximum temperature of the cycle which leads to a rapid deterioration of the efficiency at part load. Moreover, such cycle uses a large volume of gases and, therefore, requires large intake and exhaust ducts and large air filters.

The above type of power plant may or may not have an independent external load turbine. In either case, the plant, as a rule, has one combustion chamber and, therefore, offers only a limited range of control of the operating conditions. The power plants of the above type are also sluggish in their response to any change in the external load because they require speeding up and slowing down of all rotary components; stated differently, the above mode of operation is a variable speed operation; therefore, the speed of response is limited by the inertia of the mechanical components, including a compressor, and either one or two turbines. The known cycles have a large number of additional limitations such as the passing of all gases through the load turbine so that the load turbine is loaded even at no load.

Typical efficiency curves of the known cycles are illustrated in FIG. 7 at 700 and 701. In both cases, the part load efficiency drops down very rapidly as one reduces the load. Curve 700 is for a machine having a single compressor and a single turbine, without any heat exchanger. Curve 700 can be improved by introducing a heat recuperator, or exchanger, which heats the compressed air before it enters the combustion chamber by the heat from the exhaust gases of the turbine and by dividing the compressor-turbine unit into two independent parts. The efficiency curve of such power plant is illustrated at 701. The limitations of the power plant with the heat recuperator are: low compression ratio that must be used in the compressor, since, if high compression ratio is used, then the temperature of the compressed air is substantially equal to the temperature of the exhaust gases and the use of the recuperator becomes a thermodynamic impossibility. Such cycle also uses large volumes of gases; therefore, the ducting and the size of the recuperator are large with all that it entails in terms of costs, weight, and space. Moreover, the improvement in the efficiency curve is not especially marked, in spite of the cost and efforts which are required to obtain such change.

In the known cycles, the specific output, which is defined as the power output per pound of air, decreases very rapidly with the decrease in load, which, in turn, produces an equally rapid decrease in the thermal efficiency (example: 30% at full load, 7% at 10% load).

In the cycles according to this invention, the specific output remains, not exactly, but substantially constant at variable speed operation throughout the variation in the external load, when the external load turbine is operated at variable speed; therefore, the decrease in the thermal efficiency is not as large as in the open cycles (example: 35% at full load and approximately 23% at 10% load at variable speed operation of the load turbine).

In this cycle, both the external load turbine and the compressor turbine can be operated at constant maximum temperature, but it is simpler, from the control point of view, to operate the load turbine at constant maximum temperature, while the maximum temperature of the compressor turbine, driving the compressor and the auxiliary equipment, is allowed to diminish so as to maintain constant the speed of rotation of the gas generator. The term gas generator, as used in this specification and claims, means a compressor or a plurality of serially connected compressors supplying air to a combustion chamber feeding a compressor turbine; i.e., the turbine which supplies all power required by the internal load, such as compressor and all accessories. The load turbine is the turbine used for supplying useful power to an external load.

The invention also discloses an additional version of the method and apparatus in which the load turbine is operated at constant speed throughout the entire range of load variation. In this latter version, the specific output varies as the inverse function of the variation in the external load; therefore, the efficiency does not drop down as rapidly as in the case of the variable speed power plant. The inverse ratio between the magnitude of the external load and the specific output is obtained, in the constant speed power plant, by increasing the temperature of gases supplied to the load turbine with the decrease in the external load, but decreasing the density and the weight flow of the gases reaching the external load turbine. It is important to mention here that, although the gas temperature is increased with the decrease in load in this method, the equilibrium of the dynamic similarity between the compressor and the load turbine remains substantially constant because the increase in the temperature of gases is also accompanied by the corresponding decrease in density, and the variation of the temperature and density in two opposite directions within the working fluid maintains the equilibrium of the dynamic similarity between the load turbine and the compressor. Such equilibrium is indispensable for proper, stable operation of any gas turbine power plant and for avoiding hunting and oscillations between the compressor and the two turbines, choking of the turbines, and surging of the compressor.

It may be stated, in general, that the speed of the turbine is determined by the heat drop $\Delta H$ in the working fluid flowing through the turbine. If the turbine is to be operated at constant speed, this heat drop must remain constant and the density of the working fluid and the weight flow adjusted so as to supply the amount of external power which is required of the turbine.

Therefore, the constant speed operation of a gas turbine can be obtained only in accordance with two methods.

The first method of obtaining constant speed operation of the load turbine at variable load is as follows:

$\Delta H$ is constant
$T_{max}$ is constant    (1)
$\rho$ is variable
$p_1$ is variable where ΔH is the heat drop in calories/gram, across the external load turbine;
$T_{max}$ is the maximum temperature of gases entering the external load turbine;
$\rho$ is the density of gases entering the turbine in grams per cubic centimeter;
$p_1$ is the pressure of gases entering the external turbine.

The above mode of operation is disclosed in U.S. Patent No. 2,608,822, where the density $\rho$ and the pressure $p_1$ are varied in response to the variation in the external load with the aid of an auxiliary compressor-turbine set, the auxiliary compressor being connected in series with the main compressor of the main compressor-turbine set.

The second method of obtaining constant speed operation of the load turbine at variable load is as follows:

$$\begin{matrix} \Delta H \text{ is constant} \\ p \text{ is variable} \\ p \text{ is variable} \\ T_{max} \text{ is variable} \end{matrix} \quad (2)$$

This is the method that is disclosed in this application, and there does not appear to be any other thermodynamically feasible method for obtaining constant speed operation of the load turbine at variable load. The group of parameters (2) indicates that it is possible to vary the pressure, the density, and the temperature of a working fluid, or gases, in such a manner as to maintain the speed of the external load turbine constant, so long as ΔH remains constant.

The parameters (1) and (2) can be rewritten as follows:

$$\begin{matrix} \Delta H \text{ is constant} \\ p_1 \text{ is variable} \\ T_{max} \text{ is constant} \end{matrix} \quad (1')$$

and for (2), $$\begin{matrix} \Delta H \text{ is constant} \\ p_1 \text{ is variable} \\ T_{max} \text{ is variable} \end{matrix} \quad (2')$$

This is so because the density $\rho$ of the working fluid can always be derived from known relationships, since it is a function of the temperature and pressure of the fluid. Therefore, in terms of the definition of the thermodynamic cycle, it is unnecessary to specify the density of the working fluid as one of the parameters. However, it may be proper to specify $\rho$ when one must consider the power output of the turbine because the latter is the function of $\rho$.

The power plant, utilizing the principles outlined in Equations 2, may have a thermodynamic efficiency of the order of 30% at full load and approximately 25% at 10% load, at constant speed of operation of the load turbine.

A number of cycles have been proposed for stationary power plants, one of them being that disclosed in the United States Patent No. 2,608,822, mentioned previously, in which the efficiency at part load is made equal to the efficiency at full load by maintaining the maximum temperature of the cycle substantially constant and by varying the density of the air entering the main compressor and by maintaining all temperatures of the principal cycle constant. The disadvantage of the above cycle resides in that it requires the use of an auxiliary compressor-turbine set which increases the cost of the entire power plant. Such cost increase is justified for large output power plants, but it is not so for the smaller power plants. Moreover, for smaller plants, the auxiliary compressor-turbine set, as well as the main compressor-turbine set, become so small that the cost of its manufacture increases to a value which would suggest looking elsewhere for a solution to the efficiency problem. Moreover, the use of the auxiliary power plant requires a control system which is economically feasible only in connection with the larger power plants.

Yet, it is universally recognized by those skilled in the turbine art that the turbines have a large number of advantages over internal combustion engines, and the replacement of the internal combustion engines by the turbines would be made more attractive if the part load efficiency curves of the turbines were also made more attractive.

The invention discloses the cycles, and the means for carrying out such cycles, for making the part load efficiency of the gas turbine power plants higher than that of conventional power plants using open cycles. The efficiency curves for the disclosed cycles are illustrated at 702 and 703 in FIG. 7.

According to the disclosed methods and the cycles, the power plant includes a compressor, a compressor turbine driving the compressor and load turbine connected to an external load. A combustion chamber is interposed between the compressor turbine and the compressor, which, in the power plant's working at variable speed, can also be used as a combustion chamber for the external load turbine. The external load turbine can also have its own combustion chamber when it is desired to operate it either at constant speed or when it is desired to limit the speed variation to a narrower range than the range that would be present if a common combustion chamber were used for both the compressor turbine and the load turbine.

Irrespective of the number of the combustion chambers used in the power plant, its power output is controlled by the amount of fuel and air admitted into the cycle. At full load, the compressor receives air at substantially atmospheric pressure, and, at any partial load, the amount of fuel and air is reduced in proportion to the reduction in the external load. Since in one method, according to the invention, the maximum temperature $T_{max}$ and also the density of the working fluid are varied to maintain the speed of the compressor turbine or of the load turbine constant, the only way that the density can be varied is by reducing the amount of fluid entering the compressor, and such reduction in the amount of the fluid entering the compressor will produce pressure which is below atmospheric. Accordingly, the input pressure into the compressor drops below the atmospheric, or ambient pressure, at part load. The output of the compressor is divided between the two turbines. The exhaust gases of the compressor turbine, after passing through a cooler, are returned to the compressor, while the gases driving the load turbine are discharged into the atmosphere.

In another method, according to the invention, the improved efficiency of the cycle is obtained by maintaining constant the maximum temperature of gases entering the compressor turbine and also by discharging the compressor turbine into a sub-atmospheric pressure at part load, which improves the efficiency of the latter by maintaining constant high heat drop $\Delta H_{T_1}$ through the compressor turbine. The efficiency of the load turbine is maintained reasonably constant, if operated at constant speed, by maintaining $\Delta H_{T_2}$ constant, where $\Delta H_{T_2}$ is the heat drop through the load turbine; by increasing the maximum temperature with the decrease in load and by decreasing the pressure with the decrease in load, thereby reducing the weight flow through the external load turbine and shifting it into the region of lower output. The thermodynamic efficiency of the load turbine will be lowered only slightly in such case. When the load turbine is made to work at variable speed, the maximum temperature of gases entering the load turbine is maintained constant, and $\Delta H_{T_2}$ and the density as well as the weight flow are reduced. Therefore, the variation in the turbine thermodynamic efficiency will be less pronounced than in the constant speed case.

In a further method, according to the invention, the maximum temperature at the entry into the compressor turbine is allowed to decrease to the value which is determined by the heat gain obtained by expanding the gases leaving the compressor turbine to a sub-atmospheric pressure obtained at the entry into the compressor. This drop in the maximum temperature does not affect the efficiency to any marked extent because the maximum temperature ratio is decreased at the same time as the maximum pressure ratio is increased. Therefore, the overall thermodynamic efficiency of the gas generator does not change appreciably with the change in load. It should be noted here that the most sensitive part of the power plant is the compressor, and the dynamic conditions of the compressor, particularly the temperatures, do not change materially when the load varies from 100% load to about 10% load.

In the light of the above discussion, it follows that the disclosed gas turbine may have the following alternative methods of operation:

GAS GENERATOR (1) Constant speed operation.
(2) Variable speed operation.

It is preferable to operate the gas generator with the maximum temperature $T_3$ being lower at part load rather than at constant $T_3$ because of the simpler control system which is obtainable if $T_3$ is allowed to be lower at part load. It should be stated here, however, that control systems can be devised for maintaining $T_3$ constant.

During the idling period the power plant can be made to follow the following modes of operation:

(A) The pressure at the entry into the compressor is sub-atmospheric, and is at its lowest value during the idling periods;

(B) The pressure at the entry into the compressor is equal to atmospheric pressure.

LOAD TURBINE (1) The load turbine is operated at constant speed with the temperature of gases at the entry into the load turbine rising with the diminishing load but with the pressure of gases being diminished in proportion to the decrease in load. $\Delta H_{T_2}$ remains constant.

(2) The load turbine is operated at variable speed with the speed of the turbine decreasing with the decrease in the external load, but the maximum temperature of gases at the entry into the load turbine remaining substantially constant. $\Delta H_{T_2}$ decreases with the decrease in load.

In all of the above methods of operation of the power plants, the main components of the power plant are identical to each other, and the difference is in the controls rather than in the main components.

It is therefore an object of this invention to provide novel methods of operation of gas turbine power plants producing a higher thermal efficiency at part load than the known open cycle power plants.

It is also an object of this invention to provide thermodynamic cycles for gas turbine power plants having a gas generator and an external load turbine, a gas generator being operated, on the input side, at substantially atmospheric pressure at full load and sub-atmospheric pressure at partial load.

It is another object of this invention to provide a thermodynamic cycle for power plants having a gas generator, including a compressor, a compressor turbine, and an external load turbine receiving its gases from the compressor, the compressor turbine being operated at constant speed, constant heat drop, variable maximum temperature and variable pressure of gases, the gases entering the compressor being at substantially atmospheric pressure during full load and at subatmospheric pressure at any load smaller than full load.

It is also an object of this invention to provide a thermodynamic cycle of the above type in which the load turbine is operated at variable speed and constant maximum temperature and variable pressure of gases entering said turbine, at variable external load.

An additional object of this invention is to provide a gas turbine power plant having a compressor, a compressor turbine and a load turbine receiving gases from said compressor, said load turbine being operated at constant speed at variable load, said constant speed operation being obtained by varying maximum temperature and pressure of gases entering said load turbine, the temperature of gases at full load being lower than the temperature of gases at part load, and the pressure at part load being lower than the pressure at full load.

Another object of this invention is to provide a gas turbine power plant having an external load turbine, a compressor turbine, a compressor driven by the compressor turbine, said compressor discharging into said turbines, and said compressor turbine discharging into a cooler, said cooler discharging into an aspirator on the input side of said compressor, said aspirator controlling the density of gases, entering said compressor, as a function of load connected to said load turbine by varying the amount of fresh air entering said aspirator.

Still another object of this invention is to provide a gas turbine power plant having a compressor turbine, an external load turbine, a compressor driven by the compressor turbine, a first combustion chamber connected in a series circuit with the compressor and the compressor turbine, a second combustion chamber connected in the circuit of the compressor and the external load turbine, and a control system for maintaining the temperature of gases leaving the first combustion chamber so as to maintain the heat drop through the compressor turbine constant for constant speed operation of said compressor turbine at variable load, and an additional control system for maintaining the temperature of gases, leaving the second combustion chamber, constant irrespective of the condition of the external load connected to said external load turbine.

It is also an object of this invention to provide a control system for gas turbine power plants in which a speed governor, driven by a compressor turbine, is used for controlling the pressure of gases entering a compressor and the amount of fuel entering a combustion chamber interconnecting said compressor and said compressor turbine, and venting of said compressor to ambient air during the idling periods of said power plant.

The novel features which are believed to be characteristic of the invention, both as to their organization and method of operation, together with further objects and advantages thereof, will be better understood from the following description considered in connection with the accompanying drawings in which several embodiments of the invention are illustrated by way of several examples. It is to be expressly understood, however, that the drawings are for the purpose of illustration only and are not intended as a definition of the limits of the invention.

Referring to the drawings,

FIGURES 2 and 3 illustrate heat diagrams, or the Mollier heat charts, for the gas generator unit disclosed in FIGURE 1;

FIGURE 4 illustrates heat diagrams for a load turbine when the latter is operated at variable speed;

FIGURE 6 is a heat diagram for the load turbine when the latter is operated at constant speed;

FIGURE 7 is a family of thermal efficiency curves for gas turbine power plants when they are operated at variable load;

FIGURE 8 is a simplified schematic version of a low compression ratio gas turbine power plant of FIGURE 1 having heat recuperators in the circuits of the two turbines;

FIGURE 9 is a Mollier heat chart for the circuit disclosed in FIGURE 8;

FIGURE 10 is another version of the circuit disclosed in FIGURE 1, but having two compressors with a cooler between them, and heat recuperators in the turbine circuits; it is a high pressure circuit with two coolers and two heat recuperators.

FIGURE 11 is a Mollier heat chart for the circuit disclosed in Figure 10;

FIGURE 12 is a simplified schematic diagram for the circuit disclosed in FIGURE 1 but using only one combustion chamber.

Figure 1:
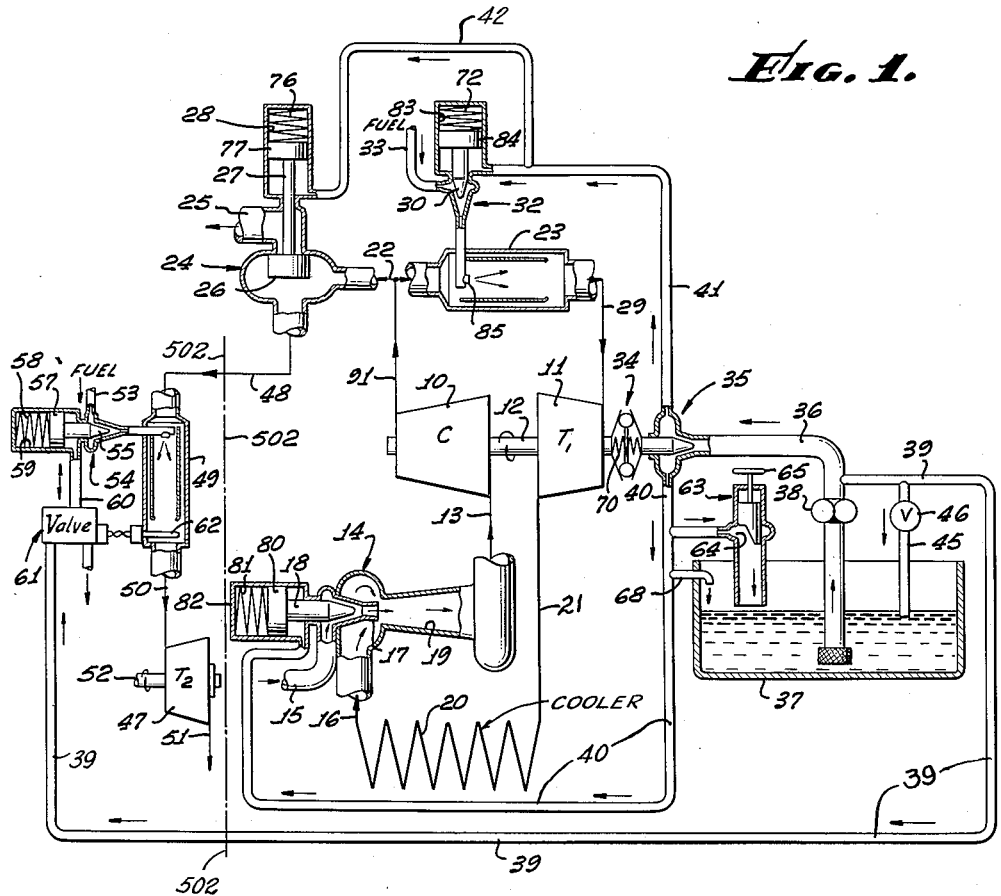
FIGURE 1 is a schematic diagram of a gas turbine power plant, including a gas generator, a load turbine, two combustion chambers for the two turbines, and a control system for operating said gas generator at constant speed and said load turbine at variable speed in response to the variation in the external load.

GAS TURBINE POWER PLANT, FIG. 1, HAVING CONSTANT SPEED GAS GENERATOR AND VARIABLE SPEED LOAD TURBINE

Referring to FIG. 1, a compressor 10 is driven by a compressor turbine 11 through a shaft 12. The compressor receives the working fluid through a duct 13 which is connected to an aspirator 14 which includes a fresh air duct 15 and a gas duct 16, an injector assembly including a nozzle 17, a needle valve 18 operated by a piston 80 and a compressor spring 81 positioned in a sliding engagement within a cylinder 82 connected to an oil pressure line 40, and a diffuser 19 which discharges into the duct 13. A gas duct 16 is connected to a gas cooler 20 which is connected to a duct 21. Duct 21 is connected at one end to turbine 11 and at the other end to the gas cooler so that all gases leaving turbine 11 pass through the gas cooler, the aspirator 14 and then into duct 13 which conveys them back to compressor 10, where they are recompressed and discharged through a duct 91. Duct 91 is connected to a duct 22 which conveys gases leaving compressor 10 to a first combustion chamber 23 and to a by-pass valve 24. Valve 24 has a bypass outlet duct 25 which opens into ambient air. Duct 25 normally is closed by means of a piston 26 having an actauting stem 27 connected to a piston 77 in a cylinder 28. Cylinder 28 has a spring 76 which opens duct 25 when pressure on piston 26 becomes low. Duct 25 is open when the power plant is in the idling position and it is closed when the power plant carries any load.

Referring once more to combustion chamber 23 and the circuit of the gas generator, including compressor 10 and turbine 11, combustion chamber 23 is connected to turbine 11 through a duct 29. The amount of fuel supplied to chamber 23 is controlled by a needle valve 32, the position of its needle 30 being controlled by a compression spring 72, a piston 84 in a cylinder 83 and an oil pressure reaching cylinder 83 through a duct 41. Valve 32 is a fuel valve which is connected to a fuel nozzle 85 and to a source of fuel through a fuel pipe 33. Shaft 12 is connected to a governor 34 which operates a needle valve 35 connected to oil lines 36, 41, and 40. Line 36 is connected to an oil tank 37 through an oil pump 38 driven by turbine 11 or by an electric motor. Oil tank 37 is connected to cylinders 83, 28, 82, and 59 of control valves 32, 24, 14, and 54 of the power plant through a plurality of oil pipes, such as pipes 39, 40, 41, and 42. An additional pipe 45 is provided between pipe 39 and tank 37 which includes a check valve 46 for discharging oil back into tank 37 when the oil pressure rises beyond a pre-determined maximum value. The connections of load turbine 47 begin at the junction of duct 91 and duct 22. Duct 22 conveys a portion of the gases leaving compressor 10 through the by-pass valve 24 to a duct 48 which is connected to the second combustion chamber 49. This combustion chamber discharges into a duct 50 which is connected to load turbine 47. Therefore, the gases from the second combustion chamber expand through turbine 47 and then are discharged as exhaust gases into ambient air through a duct 51. A shaft 52 of the load turbine is connected to an external load. Fuel to the second combustion chamber 49 is supplied through a fuel pipe 53 and a fuel control valve 54 having a needle valve 55, the position of which is controlled by a spring 58, a piston 57 positioned within cylinder 59 and an oil pressure in cylinder 59. Cylinder 59 is connected through an oil pipe 60 to an oil pressure control valve 61 actuated by a thermcouple 62 positioned in combustion chamber 49. This thermocouple maintains constant the temperature of gases leaving combustion chamber 49. The power plant disclosed in FIG. 1 uses a cycle in which the speed of turbine 47 decreases with the decrease in the external load. It is preferable to maintain constant the temperature of gases leaving combustion chamber 49 for the simplicity and the convenience of the controls. It should be stated here that it is also possible to operate the cycle with the temperature $T_{3C}$, FIG. 4 ($T_{3C}$ is the temperature of gases entering load turbine 47), having a drooping characteristic as the load decreases.

The operation of the power plant is controlled by means of a manually operated throttle valve 63 which is connected to oil pipe 40 by a valve having an orifice or an opening 64 which is connected to pipe 40. The opening of this orifice is controlled by a manually operated throttle pedal 65 which either opens or closes orifice 64, and, therefore, either increases or decreases the oil pressure in the oil lines 40, 41 and 42. Operation of throttle valve 63 has no effect on the oil pressure in line 39 which is located on the opposite side of needle valve 35 and, therefore, the pressure in pipe 39 remains constant, irrespective of the position of pedal 65.

*Full load operation of power plant in FIGURE 1.*—At full load, throttle 65 is released (it is obvious that the throttle may be arranged, for safety reasons, so as to produce idling condition when released, which is the case, for example, in automobiles) and, therefore, orifice 64 is closed. Full oil pressure is present in pipes 40, 41, and 42. As long as full oil pressure is present in pipes 40, 41, and 42, maximum oil pressure is exerted on pistons of valves 32, 24, and 14, with the result that needle valve 32 is wide open and maximum amount of fuel is admitted to combustion chamber 23. The temperature of gases leaving combustion chamber 23 will be at its peak at this instant and maximum amount of gases will be generated in combustion chamber 23. This means that maximum volume of gases, at maximum temperature, will also reach turbine 11, with the result that this turbine will be able to deliver maximum amount of power through shaft 12 to compressor 10. Compressor 10 in turn will deliver maximum weight flow of gases at maximum pressure through duct 91 because aspirator valve 14 is wide open; therefore, duct 13 is open to substantially atmospheric pressure. Accordingly, input pressure into the compressor at full load will be higher (equal to the atmospheric pressure except for the pressure drop through valve 14) than the pressure at part load.

The same high oil pressure will also keep by-pass valve 24 completely closed with the result that approximately 40% by weight of gases reaching duct 22 will be flowing through by-pass valve 24 and duct 48 to second combustion chamber 49 and then duct 50 and turbine 47, while the remaining 60% will be flowing through the first combustion chamber 23 and turbine 11.

The division of the weight flows $G_{L.T.}$ and $G_{C.T.}$ where $G_{L.T.}$ is the weight flow, in pounds per second, of gases to the load turbine, and $G_{C.T.}$ the same flow to the compressor turbine, will be as indicated above ($G_{L.T.}=40\%$ of $G_C$, where $G_C$ is the total weight flow through the compressor; and $G_{C.T.}=60\%$ of $G_C$ at full load) for one specific design of the two turbines. It may be shown that the ratio of $G_{L.T.}/G_{C.T.}$ is a square root function of the following equation:

$$\frac{G_{L.T.}}{G_{C.T.}} \sim \sqrt{\frac{T_{C.T.}}{T_{L.T.}}} \sqrt{\frac{1-\left(\frac{p_5}{p_3}\right)^{\frac{1+n}{n}}}{1-\left(\frac{p_6}{p_4}\right)^{\frac{1+m}{m}}}} \quad (3)$$

or $$\frac{G_{L.T.}}{G_{C.T.}} \sim \sqrt{\frac{T_{C.T.}}{T_{L.T.}}} \sqrt{\frac{1-\left(\frac{T_{L.T.\,EXH}}{T_{L.T.}}\right)^{\frac{n+1}{n-1}}}{1-\left(\frac{T_{C.T.\,EXH}}{T_{C.T.}}\right)^{\frac{m+1}{m-1}}}} \quad (4)$$

It may be shown that the above Equation (4) is not affected materially by the variation in the speed of the turbines. Therefore, neglecting this effect in terms of its practical effects, which are not significant, it may be thus stated that the above relationship is independent of the speed of the turbine.

where $G_{L.T.}$ is the weight flow of gases through the load turbine, lbs./sec.;

$G_{C.T.}$ is the weight flow of gases through the compressor turbine, lbs./sec.;

$T_{C.T.}$ is the absolute temperature of gases entering the compressor turbine, ° R.;

$T_{L.T.}$ is the absolute temperature of gases entering the load turbine, ° R.;

$T_{L.T.EXH}$ is the absolute temperature of the exhaust gases from the load turbine, ° R.;

$T_{C.T.EXH}$ is the absolute temperature of the exhaust gases from the compressor turbine, ° R.;

$n$ is polytropic exponent.

$m$ is polytropic exponent;

$p_3$ is the pressure at the entry into the load turbine, p.s.f.;

$p_4$ is the pressure at the entry into the compressor turbine, p.s.f.;

$p_5$ is the pressure at the exit, or exhaust, of the load turbine, p.s.f.;

$p_6$ is the pressure at the exit from the compressor turbine.

If the second square root in Equation (4) is neglected for obtaining a rough approximation of the variation in the ratio of the weight flows $G_{L.T.}/G_{C.T.}$ with the variations in $T_{C.T.}$ and $T_{L.T.}$ one can very readily see that Equation (4) becomes $$\frac{G_{L.T.}}{G_{C.T.}} \sim \sqrt{\frac{T_{C.T.}}{T_{L.T.}}} \quad (5)$$

or, that the weight flow ratio varies as the square root of the inverse ratio of the respective temperatures. This is understandable because the higher the temperature of the gases, the larger is their volume while the resistance of the circuit to the gas flow (equivalent to electrical resistance) remains substantially constant. Therefore, for example, $G_{L.T.}$ will decrease and $G_{C.T.}$ will increase when $T_{L.T.}$ is increased as long as $G_C$ and $T_{C.T.}$ are maintained constant. Constant $G_C$ means that the pressures remain constant in the above example, and the density, therefore, is also constant at the compressor.

At variable speed of the load turbine (and of the compressor turbine), decreasing $T_{C.T.}$ with the decrease in load and constant $T_{L.T.}$, which is the case in FIGS. 1, 2, 3 and 4, will decrease the weight flow ratio $G_{L.T.}/G_{C.T.}$ and $G_{L.T.}$ will decrease with respect to $G_{C.T.}$. Since the power output is the product of $G_{L.T.}$ and $\Delta H_{L.T.}$, where $\Delta H_{L.T.}$ is the heat drop through the load turbine, a decrease in $G_{L.T.}$ and $\Delta H_{L.T.}$ will produce a decrease in the power delivered by the load turbine. This will be discussed more in detail in connection with FIGS. 2 through 4.

Reverting once more to the operation of the power plant, governor 34 at this time will keep the needle valve 35 sufficiently open to admit full oil pressure to pipes 40 and 41 so as to maintain the aspirator valve 14 fully open, fuel valve 32 fully open and by-pass valve 24 completely shut off. Valve 54 will also be fully open because thermocouple 62 will be under the influence of the maximum weight flow $G_{L.T.}$.

The oil that is passed through control valve 35 to valves 32, 24, and 14 at this time maintains the speed of the gas generator unit 10—11 constant irrespective of the variations in the external load connected to shaft 52. Accordingly, the speed of the gas generator 10—11 is maintained constant throughout the entire operating cycle of this power plant by governor 34 as long as there is an external load.

It is to be understood that the governor, illustrated in this figure, is shown here in a purely diagrammatic manner, which is also true of the entire valve system. For example, it is known that it will be necessary to have a proper amount of leakage in each and every one of the valves for their proper functioning and such leakage is indicated diagrammatically in this case by means of a pipe 68 which connects pipe 40 to tank 37. In actual practice, pipe 68 will constitute a plurality of pipes which connect the respective valves to tank 37 for providing individual leakage returns from each valve.

*Variable speed gas generator.*—The circuit has been described thus far by stating that the speed of the gas generator unit 10—11 is maintained constant by governor 34. The above should be qualified by stating that there are no compelling thermodynamic, fluid dynamic, or mechanical reasons for maintaining the speed of the gas generator constant throughout its cycle of operation; and it is also possible to operate this unit, for example, so that the gas generator unit operates at a progressively lower speed with the decrease in load. This can be obtained by controlling the tension of spring 70 by means of a servo cylinder whose piston is actuated by a pressure in cooler 20 so that spring 70 is relaxed when the pressure in cooler 20 drops, thus partially closing needle valve 35, which in turn will produce partial closing of aspirator 14. In order for the above system to function more effectively, it will be necessary also to control spring 70 by means of the pressure from cooler 20, tightening this spring when the pressure decreases. This will produce a more rapid decrease in the fuel consumption with the concomitant decrease in the speed of turbine 11 because of the drop in the maximum temperature and the weight flow of gases in duct 29.

However, a number of complications are at once eliminated if the gas generator is operated at constant speed, and it is for this reason that the constant speed operation has been disclosed here as the preferred mode of operation of this power plant.

It would be improper to have a speed governor for load turbine 47 for controlling the fuel reaching chamber 49 because in the majority of cases it will be necessary for this turbine to operate at variable speed in response to the variations in the external load. Accordingly, the only feasible way of controlling the operation of this turbine, under the above conditions, is by maintaining constant the temperature of gases reaching this turbine; hence, the reason for the servo mechanism for maintaining the temperature of these gases constant.

The above system is for variable speed operation of load turbine 47. It is also possible to operate this turbine at constant speed with the circuit illustrated in FIG. 5, which will be described later in this specification.

*Idling of power plant, illustrated in FIG. 1.*—The idling of the power plant illustrated in FIG. 1 is obtained by releasing pedal 65. The orifice 64 is an irregularly shaped orifice which is diagrammatically illustrated in FIG. 1. Such release of pedal 65 closes valves 32 and 14 to the preset values with the result that only a limited amount of fuel will be admitted to combustion chamber 23 and a limited amount of fresh air will be admitted to compressor 10. Because of the rapid drop in pressure in the oil pipe 42, spring 76 will overcome the low oil pressure on piston 77 opening by-pass valve 24, and the ducts 91, 22, and 48 will become connected through this by-pass valve to an atmospheric pressure. The governor and the entire control system, including valves 32 and 14, are adjusted so as to produce a pressure at the output of compressor 10 and ducts 91, 22, and 48 which is slightly above atmospheric. At the very same time, the pressure prevailing in duct 13 and duct 21 will be only a small fraction of the atmospheric pressure such as 0.1 or 0.2 of the atmospheric pressure, because of closing of valve 18 to a preset idling position with the result that a pressure drop equal to approximately 0.9 of atmospheric pressure will exist across turbine 11 and combustion chamber 23. Therefore, only a small percentage of gases leaving compressor 10 will travel through by-pass valve 24 and duct 25 out into the ambient air, while the larger percentage of gases will flow through combustion chamber 23, duct 29, and turbine 11 so as to produce the necessary idling torque and rotation of gas generator unit 10—11.

It should be noted here that by-pass valve 24 may be eliminated altogether, in which case the gases leaving compressor 10 during the idling operation will divide and follow two parallel paths; one path is through duct 91, combustion chamber 23, turbine 11, duct 21, cooler 20, aspirator 14, and back to compressor 10, while the second path will be through ducts 91, 22, and 48, combustion chamber 49, duct 50, turbine 47, and exhaust duct 51. When high pressure cycle is used and load turbine 47 has a large number of stages, such as 6 to 8 stages, the turbine blading may offer sufficient resistance to such flow of compressed gases and, therefore, in the high pressure systems it may be preferable to use a by-pass valve 24 rather than to allow the gases to flow through the load turbine. It should be kept in mind, also that it is desirable to prevent any possibility of turbine 47 being rotated by the flow of gases during the idling period of the power plant because it would mean that this external load turbine would be delivered torque during such idling periods, which, obviously, is undesirable.

The above description, nevertheless, illustrates that the presence or the absence of by-pass valve 24 is, in the main, a matter of design and adjustment of the operating conditions, and that such by-pass valve may or may not be a part of the cycle illustrated in Fig. 1.

During this idling period the oil pressure in pipe 39 is also so low that needle valve 54 can be adjusted to close completely so that combustion chamber 49 becomes extinguished and remains extinguished during the idling period.

*Part load operation of the power plant of FIG. 1.*—At part load operation the throttle valve 63 and its pedal 65 are at an intermediate position because of the manual setting of these elements to such positions by the user of the power plant, and, as the result of such manual setting, the oil pressure in oil pipes 40, 41, and 42 will be a function of the external load connected to load turbine 47; therefore, valves 32, 14, and 54 will be in intermediate positions, while by-pass valve 24 will be closed, if the power plant has such by-pass valve. Accordingly, aspirator 14 and duct 13 leading to compressor 10 will be operating under a sub-atmospheric pressure. The minimum sub-atmospheric pressure at minimum load, may be of the order of 0.1 of atmospheric pressure. The gas generator will be operated at constant speed because of the speed regulating action of governor 34, while load turbine 47 will be operated at variable speed because the pressure head produced by compressor 10, the total weight flow G and $G_{L.T.}$ will now be lower than at full load because of the sub-atmospheric pressure on the input side of compressor 10; therefore, the pressure head across turbine 47, the density of the gases, and the weight flow $G_{L.T.}$ will be lower than at full load. Such change in the pressure head, density, and weight flow will produce a corresponding change in the heat drop $\Delta H_{L.T.}$ across the turbine even though the maximum temperature $T_{3C}$ (see FIG. 4) is maintained constant by the thermocouple-controlled servo system which regulates the supply of fuel oil to combustion chamber 49. The above decrease in $\Delta H_{L.T.}$ will produce a corresponding decrease in the speed of rotation of turbine 47. At the same time the corresponding change in the density of the gases reaching the turbine will produce a corresponding change in the torque delivered by the turbine to the external shaft.

The above cycles and their method of operation will now be described in connection with the heat charts which are FIGS. 2, 3, and 4.

MOLLIER HEAT CHARTS FOR THE POWER PLANT DISCLOSED IN FIGURE 1

*Mollier heat chart for the gas generator including compressor 10 and turbine 11.*—The enthalpy-entropy chart for the gas generator is illustrated in FIG. 2. The ambient air isobar is illustrated by a heavy line $p_0$. The full load cycle polygon 1—2—3—4 rests on a sub-atmospheric isobar $p_3$ and the part load cycle polygon 1'—2'—3'—4' rests on a sub-atmospheric isobar $p_2$. Therefore, the maximum pressure that can ever take place in duct 13 at the input into compressor 10 is that approaching the atmospheric pressure. The minimum pressure corresponds to an isobar $p_5$ in FIG. 3. Point $O_4$ in FIG. 3 may be as low as $0.1p_0$ of atmospheric pressure; point $O_4$ is a part of a cycle $O_4$—11—12—13—$O_4$ which corresponds to the cycle when the gas generator is in the idling position.

Proceeding now with a more detailed description of the heat charts, the ambient atmospheric conditions are represented by point O having a temperature $T_0$ and pressure $p_0$. When full load operation takes place, aspirator 14 in FIG. 1 is wide open and therefore full atmospheric pressure is admitted into the aspirator and duct 13 is at a slightly sub-atmospheric pressure $p_3$ due to the pressure drop through the aspirator. Duct 13 and aspirator 14 receive the working fluid not only from the ambient air but also from cooler 20, and the temperature of gases leaving cooler 20 will be somewhat higher than the temperature of the ambient air. This higher temperature is illustrated in FIG. 2 by point 6, and arrows 200 and 201 represent graphically mixing of the cooled gases from turbine 11 and of fresh air entering aspirator 14, the two fluids traveling in the opposite directions slightly below the isobar $p_0$ because the temperature of the ambient air is being raised while the temperature of the exhaust gases is being lowered as the two mix and finally reach the equilibrium point 1' at temperature $T_1$ on the chart. Accordingly, at full load, the gases entering compressor 10 are at pressure $p_3$ and temperature $T_1$, $T_1$ being greater than $T_0$. The gases entering compressor 10 are then compressed along a polytropic line 203 and emerge from the compressor at point 2 having pressure $p_1$ and temperature $T_2$. They then enter combustion chamber 23 where the temperature of gases is raised from temperature $T_2$ to temperature $T_3$ with the result that the state of the working fluid is changed from point 2 to point 3. No duct losses are illustrated in any charts and, therefore, points 2 and 3 are on the same isobar. The position of point 3 is controlled by governor 34 because it is this governor that controls the setting of valve 32 in Fig. 1 and the amount of oil reaching combustion chamber 23.

The heated gases are expanded through compressor turbine 11, as illustrated by a polytropic line 204 which connects points 3 and 4 on the chart. Point 4 is located slightly below the isobar line $p_0$ corresponding to a pressure slightly lower than the atmospheric pressure, because of the pressure drop through aspirator 14 and suction exerted by compressor 10.

The position of point 4 is determined by the heat drop $\Delta H_{C.T.}$ which is equivalent to the compressor heat rise $\Delta H_C$ in view of the respective weight flows through the compressor and turbine, thereby making the power of the turbine exactly equal to the power required by the compressor in order to operate at constant speed of rotation. The above can be represented by an equation $$\Delta H_{C.T.} G_{C.T.} = \Delta H_C . G_C \qquad (6)$$

where $G_{C.T.}$ is the weight flow of fluid, per unit of time, through compressor turbine 11, lbs./sec.;

$G_C$ is the weight flow of fluid through the compressor in the same unit of time, lbs./sec.

Since $G_{C.T.}$ is approximately 50% to 60% of $G_C$, it follows that $\Delta H_C < \Delta H_{C.T.}$ in the same ratio as the ratio of $G_{C.T.}$ and $G_C$. It may be shown that when $$T_{max} = 2200° F.$$

and the compression ratio is equal to 10 (C.R.=10), half of the total power $N_T$ produced by a typical gas turbine power plant at full load is needed for the operation of the power plant itself ($N_{C.T.}$=internal power required for operating compressor and auxiliaries), and the second half is available as a useful power output ($N_{L.T.}$=external power). Therefore $$N_{C.T.} = N_{L.T.} \qquad (7)$$

at full load, and the two turbines become identical to each other, in every respect, i.e. size, rating, etc. Also, as long as $$T_{C.T.} = N_{L.T.} \qquad (8)$$

then $$G_{C.T.} = G_{L.T.} \qquad (9)$$

When higher $T_{max}$ will become available with the advent of better high temperature alloys, acceptance of more efficient compressors and turbines, such as centripetal flow contra-rotatable compressors and centrifugal flow contra-rotatable turbines, with higher compression ratio C.R., then $$N_{L.T.} > N_{C.T.} \text{ at full load} \qquad (10)$$

and $$G_{L.T.} > G_{C.T.} \text{ at full load} \qquad (11)$$

At part load, the efficiency will diminish if $T_{max}$ is diminished, and the compressor turbine will require a greater portion of $G_C$ than at full load.

The approximate relationship $$\frac{G_{L.T.}}{G_{C.T.}} \sim \sqrt{\frac{T_{C.T.}}{T_{L.T.}}} \quad \text{(see Equation 5)}$$

may also be thought of as the relationship which, with all other parameters remaining constant, indicates that the amount of weight flow through a fixed "resistance" circuit diminishes with the increase in temperature of gases flowing through the circuit, i.e. the weight flow is inversely proportional to the absolute temperature of the gas flowing through the circuit. The "resistance" of the circuit is a fluid dynamic or aerodynamic resistance and it is substantially constant and is not affected by the speed of rotation of the turbines, as mentioned previously.

From the above description of the total flow $G_C$ and the division of this flow $G_C$ into two weight flows $G_{C.T.}$ and $G_{L.T.}$, it follows that all three flows are made to satisfy the desired weight flow conditions at full load, which is the design point, and at part load the total weight flow $G_C$ is varied according to the external load or demand on the load turbine. This is accomplished by regulating the degree of opening or closing of the aspirator valve 14 and allowing the division of $G_C$ to follow automatically the cycle conditions which are determined by the temeratures $T_{C.T.}$ and $T_{L.T.}$. The two temperatures determine the volume of gas not only by heating the gases leaving the two combustion chambers but also by either increasing or decreasing this volume by either increasing or decreasing the amount of fuel which is burned and is converted into gas.

Reverting once more to the discussion of the Mollier charts, the temperature of the fluid at the exit from the compressor turbine is equal to $T_4$, as indicated in Fig. 2. The exhaust gases leaving the turbine then are conveyed to cooler 20 where they are cooled to temperature $T_6$ which corresponds to point 6 on the heat chart. These exhaust gases then enter the aspirator 14 where they, upon being mixed with the fresh air entering the aspirator through duct 15, FIG. 1, produce a gas mixture designated by point 1.

From the description given above, it thus follows that the base of the full load cycle is represented by the subatmospheric isobar line $p_3$ which, for all practical purposes, at full load only, may be considered as coinciding with or approaching the atmospheric pressure isobar $p_0$.

The partial load cycle is illustrated by a polygon $O_2$—1'—2'—3'—4'—6'—$O_2$ resting on the sub-atmospheric isobar $p_2$ and this isobar may be either farther from or closer to the atmospheric isobar $p_0$ depending upon the reduction in the load carried by load turbine 47 of FIG. 1. One begins with point O which corresponds to ambient air; since aspirator valve 14 now is partially closed, there is a sub-atmospheric pressure in aspirator 14, the Venturi tube 19, and duct 13. Accordingly, the ambient air entering duct 15 is expanded along the expansion polytropic line 205 from pressure $p_0$ to a sub-atmospheric pressure $p_2$ and from temperature $T_0$ to temperature $T_0'$. As in the case of the full load cycle, the fresh air and the gases leaving cooler 20, after being mixed, attain a temperature $T_{02}$. Since gases enter aspirator 14 at relatively high entry velocities because of the sub-atmospheric pressure in the aspirator, the kinetic energy of these gases is converted into pressure through the diffusion of these gases in the aspirator and duct 13, this diffusion being indicated by a polytropic line joining points $O_2$ and 1'. The gases then enter the compressor and are compressed to point 2', then heated to point 3' in the combustion chamber, expanded in the compressor turbine 11 to point 4' and are then returned to the aspirator through cooler 20 along the sub-ambient isobar $p_2$ to 6', the heat drop in the cooler being equal to $\Delta H_R'$. These gases then are cooled to temperature $T_{02}$ in the aspirator with the result that the polygon again is closed at point $O_2$.

Comparison of the two polygons indicates that, besides shifting the base of the full load polygon from the ambient pressure isobar $p_0$ to the sub-ambient pressure isobar $p_2$, the maximum temperature $T_3$ of the cycle has been reduced to the maximum temperature $T_3'$ at part load. This reduction in temperature, in terms of the heat drop, corresponds to the heat gain which is obtained by converting the kinetic energy of gases into pressure which is indicated by the polytropic line 206 joining the points $O_2$ and 1'.

The polygons illustrated in FIG. 2 are for that cycle where the maximum temperature $T_3$ does not remain constant but is lowered to some lower temperature $T_3'$ which is a function of the reduction in the external load. It has been mentioned previously that this maximum temperature $T_3$ may also be kept constant in which case the partial load polygon would slide to the right of the full load polygon in the manner indicated between arrows by 207, this type of operation and the upper isobar line being partially illustrated at 208, and the expansion polytropic line for the turbine being illustrated at 209. In such case $\Delta H_{C.T.}$ will increase at part load, and since this excess heat drop and excess heat energy cannot be accepted by the constant speed compressor turbine 11, the only path for this excess energy will be into the load turbine 47 in the form of the increase in $G_{L.T.}$ and a corresponding decrease in $G_{C.T.}$. However, since the compressor turbine, under such mode of operation, would be receiving gases at higher temperature at part load, it follows that the second combustion chamber 49, under such mode of operation of the gas generator, cannot work at constant temperature any longer but must work at the decreasing temperature with the decrease in load because of the increase in $G_{L.T.}$. This will require cross-control of the combustion chamber 49 from governor 34 which complicates the control system. Accordingly, a more straightforward system is that illustrated in FIG. 2 in which the gas generator maximum temperature $T_3$ drops to some slightly lower value at part load. It should be noted here that the two heat drops between the points 3—4 and 3'—4' are both designated on the chart as being equal to $\Delta H_{C.T.}$, which means that the two heat drops are equal or substantially equal. The above is due to the fact that the total weight flow $G_C$ and the weight flows $G_{L.T.}$ and $G_{C.T.}$ of gases at full load are much larger than the weight flows at partial load and, therefore, although the heat drops are equal, or substantially equal, the total power output of the compressor turbine (as well as of the load turbine) undoubtedly will be much less at part load than at full load, and in all cases, will be equal to the power required by the compressor.

It is quite important to call attention to the fact that the cycle includes the heat drop $\Delta H_{C.T.}$ between points 3'—4' which now remains substantially equal to the similarly designated heat drop $\Delta H_{C.T.}$ at full load in spite of the fact that the maximum temperature $T_3$ has been reduced to $T_3'$. This is made possible by discharging the gas turbine into the subatmospheric pressure which now prevails in cooler 20. The result of the above is that the heat drop $\Delta H_{C.T.}$ now is made available on the exhaust side of the turbine. It also should be noted that the efficiency of the compressor will remain substantially the same because the temperatures $T_1$ and $T_1'$ are substantially the same, and it is the temperature of the gases that affects the efficiency of the compressor more directly than the density of the entering gases. The temperature of the gases entering the compressor is maintained substantially constant because of the presence of cooler 20 and also because of the conversion of the kinetic energy of gases into potential energy when the operating cycle enters the sub-atmospheric pressure region of operation.

An additional factor that contributes to the improved efficiency of the overall cycle is the fact that the load turbine 47 operates at constant maximum temperature, as will be pointed out more directly in connection with the description of the Mollier heat chart for the load turbine, which is illustrated in FIG. 4.

It should be also mentioned here that the compressor polytropic line between points $O_2$ and 2' is not a single polytropic line but is a composite line consisting of a polytropic line 206, between points $O_2$ and 1' and also the polytropic line between point 1' and point 2'. The gain in the compression indicated by line 206 is obtained in the aspirator 14 while the gain obtained in the compressor is indicated by line 208 between points 1' and 2'. However, insofar as the turbine is concerned, it obviously is not capable of differentiating as to whether the gain has been obtained in the compressor or in the aspirator, and, therefore, the turbine merely "recognizes" that there has been a total pressure rise which corresponds to 206+208.

The only remaining quantity that should be discussed in conection with what is illustrated in FIG. 2 is the heat drops $\Delta H_R$ and $\Delta H_R'$ through cooler 20. These quantities remain substantially constant because there is no marked change in the temperature of the gases leaving the turbine and although the density of the gases going through cooler 20 does decrease with the decrease in load and therefore the film coefficient does decrease, the weight flow also decreases; therefore, the effectiveness of the cooler remains substantially constant or unaltered.

*Mollier heat chart for gas generator at idling speed.*—This chart is illustrated in FIG. 3, and it illustrates that mode of operation when the plant is made to operate at subatmospheric pressure on the input side of the compressor. Therefore, the pressure in the order of 0.1 atmosphere prevails at duct 13. This pressure is illustrated by an isobar line $p_5$, and the specific point $O_3$ on this isobar illustrates the state of gases entering aspirator 14 at this time. This point is reached by reducing the atmospheric pressure indicated by point O on the atmospheric pressure isobar $p_0$ to the pressure on the sub-atmospheric pressure isobar $p_5$ indicated by a point $O_3$. The air is then pre-heated in aspirator 14 in the same manner as in FIG. 2 by being mixed with the exhaust gases, with the result that its temperature is raised to that indicated by point $O_4$ on the same isobar. The kinetic energy of gases entering the aspirator 14 is converted into pressure, with the result that the pressure 1" is attained on the polytropic line 300, and this pressure is finally raised by compressor 10 to a point 11 on an isobar $p_4$, which is slightly above atmospheric. This pressure should be slightly higher than atmospheric for proper purging of gases through duct 22 and the now open by-pass valve 24, when such by-pass valve is used. When the by-pass valve is not used, then this slightly higher than atmospheric pressure is necessary in order to purge the circuit through the external load turbine 47. Such purging enables the cycle to obtain sufficient amount of fresh air through duct 15 so as to maintain combustion of fuel in chamber 23. Such burning of fuel raises the temperature of gases from point 11 to point 12 in FIG. 3, and the heated gases are then expanded through the compressor turbine 11 to subatmospheric pressure indicated by the isobar line $p_5$, such expansion of gases being indicated by a line 12—13. The cycle is then closed by joining point 13 with point $O_4$ along the isobar line $p_5$ by passing the exhaust gases through cooler 20 and aspirator 14.

The relationship of the idling polytrope $O_4$—11—12—13—$O_4$, with respect to the full load and the partial load polytropes, is also illustrated in FIG. 3. The full load polytrope is indicated by the polytrope 1—2—3—4—1, while the partial load polytrope is indicated by the polytrope $O_2$—2'—3'—4'—$O_2$.

The difference between the isobar line $p_4$ and the isobar $p_0$, which is the atmospheric pressure isobar, is indicated primarily by the degree of purging that is called for by the cycle and the flow losses that are encountered in the discharge duct 22 and the by-pass valve 24, if the latter is used, or the flow losses that are encountered in the ducts 91, 22, 48, combustion chamber 49, duct 50, and the external load turbine 47. When by-pass valve 24 is used, points 11 and 12 in FIG. 3 are substantially at atmospheric pressure.

*Mollier heat charts for load turbine 47.*—This chart is illustrated in FIG. 4. It is the chart for the constant maximum temperature mode of operation of the turbine, this maximum temperature $T_{3c}$ being maintained constant by means of thermocouple 62 in the manner previously described in the course of the description of FIG. 1. The full load maximum heat drop is illustrated by the heat drop $\Delta H_{FL}$ while the part load heat drop is illustrated by $\Delta H_{PL}$. At full load the polygon begins with point O which corresponds to the atmospheric pressure $p_0$ and temperature $T_0$. This point is shifted to point 1 in the same manner as in FIG 2. It is then raised to point 2 by compressor 10. This point is identical to point 2 in FIG. 2. Accordingly, up to this point the polygon represents no more than what has already been described in connection with FIG. 2. At this point, compressed gases travel to chamber 49 where their temperature is raised from $T_2$ to $T_{3c}$, whereupon the heated gases are expended through the external load turbine reaching point 8 which is located on the atmospheric isobar line. The polygon therefore is closed by the isobar line $p_0$ between points 8 and O. Since the temperature $T_{3c}$ is maintained constant, the external load turbine polygon is only capable of traveling in the manner indicated by the double arrow 400 located along the maximum temperature isothermal line $T_{3c}$. Accordingly, the part load polygonal is O—$O_1$—$O_2$—2'—7—8'—O. Examination of the full load and the part load polygons shows that the heat drop $\Delta H$ through the load turbine is reduced in proportion to the load carried by the turbine. This is graphically illustrated in FIG. 4 by the difference between $\Delta H_{FL}$ and $\Delta H_{PL}$, the latter being much smaller than $\Delta H_{FL}$. Moreover, there is a corresponding reduction in pressure, such as from $p_1$ to $p_1'$, density, $\rho$, and the weight flow $G_{L.T.}$, all of which reduce the power output of the external turbine. The pressure changes and the concomitant density and weight flow changes are due to the shifting of the full load cycle for the gas generator from the atmospheric pressure isobar $p_0$ to the sub-atmospheric pressure isobar $p_2$ which in turn shifts the pressure from $p_1$ to a correspondingly lower pressure $p_1'$ at the output of compressor 10. The pressure, density, and weight flow changes are produced by the operation of the aspirator 14 and pedal 65.

In the disclosed cycle $\Delta H_{PL}$ is equal to zero when the external load is equal to zero. This is so because $\Delta H_{PL}$ diminishes quite rapidly with the load. When $p_0$ intersects the isothermal line $T_{3c}$, then $\Delta H_{PL}=0$ in FIG. 4. Therefore, the external load turbine will not produce any torque at no load.

The thermodynamic efficiency of the load turbine will remain reasonably constant as long as it is operated at constant maximum temperature $T_{3c}$ in the manner indicated in FIG. 4. Moreover, such mode of operation offers the simplest control system because all that is required of the servo system disclosed in FIG. 1 including the thermocouple 62, valve 56, and servo motor 61, is to maintain constant the temperature of gases leaving combustion chamber 49.

It has been mentioned previously that the maximum temperature $T_{3c}$ may be made to decrease in the same manner as the maximum temperature $T_3$ in FIG. 2 when it is desired to have an exceptionally rapid diminution in load and speed of the load turbine as the position of throttle valve 65 is varied. Such mode of operation of the power plant will be indeed very rare in practice since by far the largest envisaged applications of the disclosed power plant will not call for such unusual characteristics for the load turbine. In view of the above, the heat chart of the above type has not been illustrated in FIG. 4. However, it can be very readily envisaged since it merely means that $T_{3c}$ will drop to $T_3'$ in FIG. 4 and the turbine polytrope will follow line 3'—4' until it intersects the isobar $p_0$.

The thermal efficiency curve for the variable speed power plant is illustrated in FIG. 7 by curve 703. This is the best efficiency characteristic curve among the four curves shown in FIG. 7. The full load efficiency is approximately 35% and is higher by approximately 5 points than the full load efficiencies for the other power plants. This 5-point gain in the full load efficiency, indicated by $\Delta \eta$, is obtained because of the operation of the load turbine 47 at maximum temperature $T_{3c}$ throughout the entire cyclic operation of the power plant, including the full load. This is not the case in cycles which operate at progressively decreasing temperatures with the decrease in load. The circuit disclosed in FIG. 5 of this application also has improved efficiency, in which case the load turbine is operated at constant speed. The efficiency for the latter circuit is illustrated by curve 702 and the power plant for this mode of operation will be described later.

Before proceeding with the description of such power plant, it should be stated here, by way of a brief summary, that the gains in the efficiencies, at part load, are obtained in the disclosed cycle by:

(1) Varying the density of the working fluid as a function of the variation in the external load.

(2) Making the compressor perform its compression of the working fluid in the lower compression work region at part load.

(3) Maintaining the gas generator turbine in the region of high expansion, i.e., discharging the compressor turbine into partial vacuum at part load.

(4) Maintaining the maximum temperature of the load turbine cycle constant at variable load, and maintaining the temperature of gases entering the compressor turbine if not constant, then at least reasonably constant.

In the above enumeration of factors which contribute to the efficiency of the disclosed cycle, variation of the density of the working fluid is mentioned as the first item, and, therefore, it would be logical to conclude that the density variation is considered to be the most important factor in attaining high efficiency at part load. It is fully appreciated that the prior art power plants also vary the density of the working fluid with the variation in the external load but, while in the prior art such variation in density is obtained solely by the variation of the maximum cycle temperature $T_3$ or $T_{3c}$, in the cycles disclosed here such variation in density is obtained by constantly varying the position of the basic isobar line with respect to the ambient isobar $p_0$ (see, for example, the sub-atmospheric pressure isobar $p_2$ in FIGS. 2 and 4) and at the very same time maintaining constant the maximum temperature of the cycle, such as $T_{3c}$ in FIG. 4.

Figure 5:
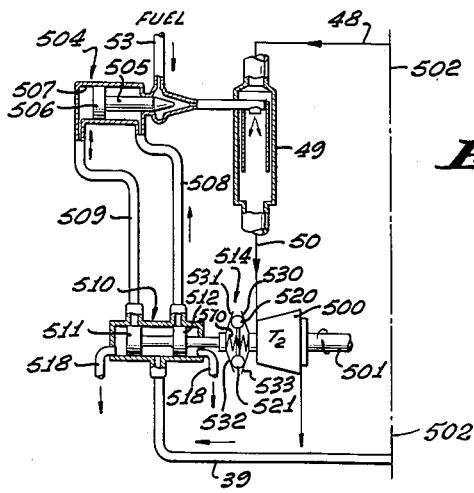
FIGURE 5 is a schematic diagram of the load turbine and a portion of the control system suitable for maintaining the speed of the load turbine constant at variable load.

*Cycles for constant speed operation of the load turbine.*—FIG. 5 discloses the cycle in which the power turbine 500 is operated at constant speed irrespective of the variation in the load connected to its shaft 501. Only the load turbine and its control equipment is illustrated in FIG. 5, since the remaining portion of the circuit, including the gas generator 10—11 and the control system for the gas generator, is the same for FIG. 5 as for FIG. 1. Accordingly, a phantom line 502 is illustrated in FIG. 5 which corresponds to the same line illustrated in FIG. 1 for matching the portion of the circuit illustrated in FIG. 5 to the main portion of the circuit illustrated in FIG. 1 for obtaining the complete power plant circuit.

Those elements which are identical in FIGS. 1 and 5 have identical numbers. The gases generated by the gas generator enter conduit 48. Combustion chamber 49 is connected to source of fuel 53 through a valve 504 which includes a needle valve 505, a piston 506 and a cylinder 507 connected to oil pipes 508 and 509 which in turn are connected to a control valve 510 having two pistons 511 and 512 connecting and disconnecting oil pipe 39 through the oil pipes 508 and 509, depending upon the setting of control valve 504, which in turn is determined by the position of a governor 514. Governor 514 is mounted on a shaft 501 of a load turbine 500, and it is the purpose, or the function, of this governor to maintain the speed of load turbine 500 constant irrespective of the variation in load connected to shaft 501.

The above is accomplished in the following manner: It may be remembered that the gas generator in FIG. 1 is operating at constant speed but variable density. The density of gases entering duct 91, FIG. 1, and duct 48, FIGS. 1 and 5, is made to vary as a function of the load connected to shaft 501 of load turbine 500 by manually controlling valve 63 and, through valve 63, the valves in the circuit disclosed in FIG. 1, particularly aspirator valve 14 and fuel valve 32.

The speed of any turbine, whether it is turbine 11 in FIG. 1 or turbine 500 in FIG. 5, is determined by, and is the direct function of, the square root of the heat drop $\Delta H$ such as $\Delta H_{C.T.}$ in FIG. 2 or $\Delta H_{L.T.}$ in FIG. 6, the latter figure being the Mollier chart for the constant speed turbine illustrated in FIG. 5.

The torque delivered by any turbine is the direct function of the density of the working fluid.

From the above two relationships, namely the heat drop and the density relationship, it follows that in order to maintain constant the speed of the load turbine 500, one should satisfy the following relationship:

(1) The heat drop $\Delta H_{L.T.}$ must remain constant throughout the operating cycle of the turbine.

(2) The density of the working fluid reaching turbine 500 through duct 50 must be varied as a direct function of the load connected to shaft 501.

From the above it also follows that combustion chamber 49 in Fig. 5 can no longer be a constant temperature combustion chamber, but it must be operated so as to maintain the heat drop $\Delta H_{L.T.}$ constant. This is accomplished by means of speed governor 514 which operates as follows: when the speed of turbine 500 begins to drop, spring 570 of the governor, which is in tension, shifts the position of pistons 511 and 512 to the right because flyballs 520 and 521 are pulled toward the center or the axis of rotation by the sloped surfaces of spring members 530—533. Such shift of the pistons 511 and 512 admits more oil to pipe 508 from pipe 39 and opens pipe 509 to the drain pipe, or return pipe, 518. This opens the needle valve 504, and more oil is admitted to combustion chamber 49. The process is reversed when the speed of shaft 501 is increased above a predetermined value. Therefore, the speed of shaft 501 is controlled by maintaining constant the heat drop $\Delta H_{L.T.}$ across turbine 500, irrespective of the load connected to shaft 501 and irrespective of the density of the gases reaching turbine 500 through duct 50.

*Heat chart for load turbine cycle operating at constant speed.*—This chart is illustrated in FIG. 6. The turbine polygon, which is represented by the points 1—2—9—1 at full load and 1—2—10—9'—1 at part load, illustrates at the extreme left and right portions two heat drops, one being heat drop 2–9 which corresponds to the $\Delta H_{L.T.}$ at full load, and the other being the heat drop represented by polytrope 10—9', which corresponds to $\Delta H_{L.T.}$ at minimum load. The magnitudes of the two heat drops are equal.

The load turbine polygons in FIG. 6 are constructed in proper relationship with respect to the full load and partial load points 1—2—3—4—1 and $$O_2—1'—2'—3'—4'—O_2$$

respectively, of FIG. 2.

At full load, maximum density of the working fluid corresponds to point 2 having pressure $p_1$ and temperature $T_2$, and this state of gases possesses sufficient potential energy to operate the load turbine at proper constant speed at full load without any additional increase in the temperature of the working fluid. Therefore, the polytrope 2–9 begins at point 2 and terminates at point 9. Point 2 is the point which represents the state of the fluid in duct 91 on the output side of the compressor, while point 9 lies on the atmospheric pressure isobar $p_0$. The compressor polytrope line 1—2 and the turbine polytrope line 2—9 are displaced from each other because of the entropy gains in the compressor and in the turbine and, therefore, in this instance, form a triangle 1—2—9—1.

The minimum load heat drop represented by the polytrope line 10—9', which has the same magnitude as the full load polytrope 2–9, is represented to have the same maximum temperature $T_3$ as the maximum temperature of the full load gas generator cycle indicated by point 3 and $T_3$ on the chart. Point 10 need not necessarily lie on the same isothermal line as point 3 but it is logical to have it lie on the same isothermal line because the same high temperature alloys are used for the compressor as well as the load turbines and, therefore, the load turbine should be operated at the same maximum temperature as the compressor turbine so as to maintain the thermal efficiencies of the two turbines as nearly constant as possible at full load as well as at minimum load. The dotted line 600 in FIG. 6 and the double-headed arrow 602 indicate the direction of travel of the polytropic lines 10—9' (or 2–9) between the two extremes of the polygon as the load increases or decreases. While the upper end of the polygon follows line 600, the lower end of the polytrope follows the atmospheric pressure isobar $p_0$.

From the above description of FIG. 6, it follows that the combustion chamber 49 is extinguished and valve 504 is completely closed when turbine 500 is carrying full load. Therefore, in this instance, the turbine operates on the potential energy of the fluid supplied to it directly by compressor 10, and this potential energy is not supplemented by having any heat energy and additional gases produced in combustion chamber 510. As the load decreases, combustion chamber 510 begins to supply additional gases, and increases the temperature of the working fluid passing through it to the turbine. The gases leaving combustion chamber 510 reach maximum temperature $T_3$, indicated by point 10 in FIG. 6, at maximum load.

It is a universally accepted principle that, in order to have as high efficiency as possible in any power plant, at full load or part load, the maximum temperatures of the cycle, such as $T_3$, must be maintained as high as possible. This basic principle is followed and used in the cycle disclosed in FIG. 1 in which the temperature $T_3$ is maintained constant for the load turbine (see FIG. 4 and $T_{3c}$), and it is allowed to decrease only to a limited extent in the operation of the gas generator 10—11 (see FIG. 2 and the points 3 and 3' and temperature $T_3$ and $T_3'$).

The above being the case, what is illustrated in FIG. 6 constitutes the reversal of the basic principle in that the temperature $T_2$ in FIG. 6, at full load, is the lowest in this cycle, and it is maximum at point 10 at the lowest load. This mode of operation and temperature control of the gases used for operating the load turbine will produce a loss in the efficiency at full load, which is indicated by $\Delta \eta$ in FIG. 7. In one specific example, illustrated in FIG. 7, this loss is equal to 5 points. It is not possible by any known other means to obtain constant speed operation of the load turbine, without the loss of dynamic similarity, except in accordance with the method disclosed in U.S. Patent No. 2,608,822 and by means shown in FIG. 6. Such dynamic similarity, which is indispensable, is maintained throughout the range of operation of the power plant disclosed in FIGS. 1, 5, and 6. Therefore, all the machines are in a matched equilibrium throughout the entire load range.

It should be pointed out here that although a lower thermal efficiency of the cycle at full load has been accepted in this case, in return for such lower efficiency, one obtains a much flatter efficiency characteristic through the greater part of the external load variation because of the increase in the temperature of gases supplied to the load turbine with the decrease in load. Such choice of the efficiencies, at full load and part load, is justifiable when the load turbine operates at full load only for short periods of time, and, therefore, the greater part of the time the machine operates at part load with good efficiency. Accordingly, the above cycle is economically advantageous when it is more important for the constant speed machine to have a flat efficiency characteristic throughout the greater part of its range of operation rather than the maximum obtainable efficiency at full load and poor efficiency characteristic at part load.

If such reduction in the efficiency at full load, which undoubtedly also affects the efficiency at part load, does not appear to be justified or is too costly because of the contemplated operating schedules, one then should be prepared to pay for the added advantage of having the maximum obtainable efficiency throughout the entire load range, at constant speed operation, by utilizing the cycle disclosed in U.S. Patent No. 2,608,822 where the maximum temperature $T_3$ and all other temperatures, such as $T_1$, $T_2$, and $T_4$, do remain constant at all loads and the variable load operation is obtained by varying only the density and weight flow of the working fluid reaching the load turbine.

Before concluding the description of the power plants and the cycles disclosed in FIGS. 1 through 6, it may be mentioned here, as a matter of general interest, that, for obtaining the same ratings in FIGS. 1 and 5, load turbine 47 in FIG. 1 will be larger in size than load turbine 500 in FIG. 5. This difference in size will also produce a corresponding difference in the power output of the two turbines, turbine 47 delivering more power at full load than turbine 500. This difference is due to the fact that turbine 500 in FIG. 5 is operated at lower temperature at full load and, therefore, the density of the gases in this case is much greater than the density of the gases in FIG. 1.

POWER PLANTS WITH HEAT RECUPERATORS IN THE GAS GENERATOR AND LOAD TURBINE

The heat charts disclosed in FIGS. 1, 2, 3, 4 and 6 are for a reasonably high compression ratio obtainable with compressor 10. Therefore, in the above charts, there is a reasonably high temperature rise between points 1 and 2 or 1' and 2'. In view of the above, the heat difference between points 2 and 4, or points 2' and 4', is not sufficiently large in FIG. 2, and, therefore, it is not worthwhile to have a heat recuperator in the compressor turbine circuit. The same is also true of the load turbine heat chart in FIG. 4, only a very small temperature difference being present between the same points in the above figure.

FIGS. 8 and 9 illustrate the power plant similar to that illustrated in FIGS. 1 and 5, but with the compressor 10 having a lower compression ratio than the compressor in FIGS. 1 and 5. When this is the case, there is a much greater difference between the temperatures $T_4$ and $T_2$ in this case (FIG. 9) than in the case of FIG. 2 which at once enables one to use a heat recuperator 800 in the circuit of the gas generator. This marked difference in temperatures is also present on the heat chart (not shown) for the load turbine 47.

The power plant with the two heat recuperators 800 and 801 is illustrated in FIG. 8. No control circuits are illustrated in FIG. 8 for simplifying the drawing, since the control elements used in FIG. 1 would also be applicable to the circuit illustrated in FIG. 8.

As in FIG. 1, gases are supplied to compressor 10 through aspirator 14 which is connected to fresh air duct 15 on one side and to cooler 20 on the other side. The aspirator discharges into duct 13 which is the duct connected to the compressor. The compressed fluid discharges into duct 91, and this duct is connected to heat recuperator 800 which includes cores 802 and 803. Core 802 is connected to combustion chamber 23, and the latter discharges into duct 29 connected to turbine 11. The exhaust gases from turbine 11 are ducted through duct 21 which is connected to core 803. The latter discharges into duct 804 which is connected to cooler 20. Approximately 40% of the air generated by compressor 10 is discharged into duct 22 and then into a core 806 of heat recuperator 801. It then enters chamber 49, then duct 50, external load turbine 47, duct 51, core 803 of the heat recuperator 801 and finally the exhaust duct 810.

The cycle with the heat recuperators 800 and 801 is primarily applicable to the variable speed mode of operation of the load turbine because the operation of the heat recuperator is controlled solely by the relative positions of points 2 and 4 or 2' and 4' on the heat chart. Comparison of the charts in FIGS. 4 and 6 discloses that the heat recuperator would not be effective in the case of FIG. 6, especially when combustion chamber 510 is extinguished, which is the case at full load. Therefore, point 9 in FIG. 6 actually is at much lower temperature than point 2. However, point 9' in the same figure is considerably higher than point 2 and, therefore, the operation of the heat recuperator 801 at part load becomes feasible.

One solution of the above heat recuperation problem is illustrated in FIG. 8 which includes a valve 812 and a duct 814. This valve 812 can be made to remain closed at part load and open at full load so as to discharge the expanded gases leaving load turbine 47 directly into an atmosphere through duct 814. The above arrangement represents, in a sense, a by-pass valve for the recuperator 801 which becomes opened only at full load.

Referring now to FIG. 9, which illustrates the heat diagram for the power plant illustrated in FIG. 8, and especially its gas generator 10—11, it begins at point O, which corresponds to the atmospheric pressure and temperature. At the entry into the compressor, at full load, the gases entering the compressor are at point 1, which is slightly below the atmospheric pressure because of a slight vacuum prevailing in the aspirator. The gases are then compressed to point 2 and then enter the heat recuperator 800 where their temperature is raised from point 2 to point 8 producing heat rise $\Delta H_{E_2}$. The heat rise in combustion chamber 23 is represented by $\Delta H_N$, which results in the temperature rise from point 8 to point 3. There follows an expansion of gases through turbine 10, which produces point 4. The temperature of gases is then lowered from temperature $T_4$ to temperature $T_7$ in the heat recuperator 800, producing a heat drop $\Delta H_{E_1}$. After the gases leave heat recuperator 800 they are discharged into cooler 20, where their temperature is lowered once more from $T_7$ to $T_6$ producing a heat drop $\Delta H_R$. The gases then again re-enter aspirator 14 producing the final closing of the cycle at point 1.

The only difference that exists between the polygon 1—2—3—4—1 of FIG. 2 and the similarly numbered polygon in FIG. 9 resides in the fact that, in FIG. 9, there is a heat gain $\Delta H_{E_2}$ which is produced by the corresponding heat drop $\Delta H_{E_1}$ in the heat recuperator 800. $\Delta H_{E_1}$ is greater than $\Delta H_{E_2}$ due to the ratio of the respective weight flows of gases in core 802 and in core 803; core 802 carries the entire output $G_C$ of compressor 10, which corresponds to 100% of the working fluid used in the entire cycle, while core 803 carries only 60% of the working fluid, which corresponds to $G_{C.T.}$ It does not appear necessary to discuss at length the heat diagram for partial load because it is identical to that for the full load insofar as its thermodynamic features are concerned, except that it is based on the sub-ambient pressure isobar $p_2$ rather than the slightly sub-ambient pressure isobar $p_0'$ for the full load. It is indicated by the following points on the chart $$O_2—1'—2'—3'—4'—7'—6'—O_2$$

The pressure rise between the points $O_2$ and 1' is due to the conversion of the kinetic energy of gases into pressure in aspirator 14 in the manner described previously.

HIGH PRESSURE-HEAD HEAT RECUPERATION CYCLE AND CIRCUIT UTILIZING TWO COMPRESSORS

FIG. 10 discloses the high pressure circuit in which utilization of a heat recuperator 1000 is made possible because of the introduction of a cooler 1001 between compressors 1002 and 1003, both mounted on the same shaft 1004 connected to a compressor turbine 1005. The use of the two compressors and of cooler 1001 between the two compressors, and the operation of the entire cycle at much higher maximum pressure than is possible in FIGS. 1 and 8, constitutes the main difference of this cycle as compared to the cycles disclosed in the prior figures, and especially FIGURES 8 and 9 which are the low pressure cycles.

Referring once more to FIG. 10, the control system for the power plant illustrated in FIG. 10 is identical to that illustrated in FIG. 1; therefore, its illustration in FIG. 10 has been omitted. Compressor 1002 receives the mixture of exhaust gases from a compressor turbine 1005 and fresh air from duct 15 through aspirator 14 and duct 13. The compressed air is then discharged into cooler 1001 and then is directed to the second compressor

1003, where it is compressed to a still higher pressure. It is then discharged into a duct 1006, which corresponds to duct 91 in FIGS. 1 and 8. At point 1008 part of the compressed gases will go to load turbine 47 and part of the gases will go to compressor turbine 1005. The previously mentioned division of gases, namely 60% of gases going to the internal turbine and 40% of the compressed gases going to the external turbine, now will be improved because of the higher efficiency of the compression process, with the result that a lower percentage of gases will be required for operating compressor turbine 1005, such as a 50%–50% division mentioned previously.

The power plant described in FIG. 10 is the most efficient power plant of all the power plants disclosed here, but its cost is higher than the cost of the other power plants disclosed in the earlier figures because of the use of two compressors, two heat recuperators and two coolers. Its efficiency may be of the order of 40% or more, and the part load efficiency characteristic will be even flatter than the curves 702 or 703 of FIG. 7. This is so because the heat recuperators 1000 and 1011 will not only contribute to the peak efficiency at full load, but will produce the sustaining effect at part load.

The remaining portion of the power plant cycle disclosed in FIG. 10 is identical to that disclosed in FIG. 8, and, therefore, needs no detailed description. That portion of gases which is necessary for operating the gas generator flows through core 1012, combustion chamber 1014 and compressor turbine 1005. The exhaust gases from turbine 1005 are directed through a duct 1016 to a core 1018 of the heat recuperator, an, upon their emergence from the heat recuperator, they enter cooler 20, then aspirator 14, which completes the closed loop portion of the gas generator circuit.

That part of the gases which is used by load turbine 47 flows through the heat recuperator core 1020, combustion chamber 1022, and turbine 47. The exhaust gases from turbine 47 discharge through a duct 1024 and a core 1026, whereupon they are exhausted into an atmosphere through a duct 1028. A bypass valve 1030 is provided in duct 1024 which performs the same function as the bypass valve 812 in FIG. 8. This valve opens duct 1024 to ambient air at full load, when the external load turbine 47 is a constant speed turbine.

*Heat chart for the cycle disclosed in FIG. 10.*—Referring to FIG. 11, point 1 is obtained in aspirator 14; the working fluid is then compressed along a polytropic line 1–10, which corresponds to the compression of the fluid in the first compressor 1002. The compressed gases are then cooled in cooler 1001 to a point 11, compressed in compressor 1003 to a point 2 on an isobar line $p_1$, which corresponds to the maximum pressure obtained in the cycle. It should be stated here that although the isobar $p_1$ in FIG. 11 has the same identification as the similar isobar in the prior charts described herein, the pressure corresponding to the isobar $p_1$ in FIG. 11 will be much higher than in the prior charts. The temperature of the fully compressed gases is then raised to point 8 in heat recuperator 1000 and then to point 3 in combustion chamber 1014. There follows an expansion of gases in load turbine 1005, which produces point 4. This is followed by the lowering of the temperature of gases in recuperator 1000, which is indicated by point 7. There is an added cooling of gases in cooler 20, which is indicated by points 7 and 6, and the final cooling of gases in aspirator 14 indicated by points 6 and 1.

Examination of the full load polygon in FIG. 11 indicates that if the compression of the working fluid were to be performed in a single compressor, then the polytropic line 1–10 would continue until it would intersect the high pressure isobar $p_1$ which would produce point 8' on the above isobar. Comparison of the position of this point with point 4 reveals that the temperatures of the points 8' and 4 would be so close to each other that the use of any heat recuperator, such as 1000 in the circuit of the gas generator, would be an impossibility. Hence, the reason for using two compressors and cooler 1001. This technique is well known to the prior art.

The description of the part load polygon appears to be unnecessary in the light of the above description. As previously, the part load polygon merely rests on the sub-atmospheric pressure isobar $p_2$ as compared to the full load polygon.

The power plant disclosed in FIG. 10 will have a comparable efficiency to the power plants disclosed in U.S. Patent No. 2,608,822 over the entire operating load range. The circuit disclosed in FIG. 10 is more suitable for power plants having smaller power output than the power plants disclosed in the above patent. The control system of the power plant in FIG. 10, which is identical to that disclosed in FIGS. 1 and 5, is simpler than the control system necessary for the power plant disclosed in Patents Nos. 2,608,822 and 2,731,570. However, the power plant of FIG. 10 will require larger turbomachines, large duct, larger cooler and heat recuperators than the circuits disclosed in the above patents. When the desired power output is not especially high, the above increase in size may even be considered as an advantage rather than a disadvantage because of the simpler machine shop procedures. In such case, the speed of response of what is disclosed in FIG. 10 and what is disclosed in the patents is in the same range because of the small inertia of the auxiliary compressor-turbine combination used in the patents.

*Power plant with a single combustion chamber.*—FIG. 12 discloses a power plant which is identical to that disclosed in FIG. 1, except that the power plant illustrated in FIG. 12 now has only one combustion chamber 1200 which is common to compressor turbine 1201 and the load turbine 1202. The control system for the power plant disclosed in FIG. 12 is identical to that illustrated in FIG. 1, except that the control system for the second combustion chamber 49 is eliminated in FIG. 12. The by-pass valve 24 is still present in the circuit illustrated in FIG. 12 and performs the same function as the same valve in FIG. 1. The power plant illustrated in FIG. 12 also includes an aspirator 14 which is identical to aspirator 14 in FIG. 1 and a cooler 20 identical to cooler 20 in FIG. 1.

The heat charts for the gas generator in FIG. 12 are identical to the heat charts illustrated in FIGS. 2 and 3, while the heat chart for the load turbine is similar to that illustrated in FIG. 4, with the exception that while in FIG. 4 the temperature of gases leaving combustion chamber 49 remains constant, as indicated by points 3 and 7 in FIG. 4, in FIG. 12 the load turbine will not be operated with constant maximum temperature but will follow the temperature drops illustrated in FIGS. 2, 3, and 4 by points 3 and 3'. Accordingly, the load turbine, in this case, will be operated at the decreasing maximum temperature with the decrease in load and will have a lower thermal efficiency than its thermal efficiency in FIG. 1. This lower thermal efficiency is compensated for by the simplicity and lower initial cost of the circuit.

I claim:

1. A cyclic circuit for a gas turbine power plant, said circuit including: serially connected compressor having an input side and an output side, first duct means connected to the output of said compressor, a first combustion chamber, a compressor turbine, a cooler, a mixing valve and an input duct connected to the input side of said compressor; and a second circuit connected to the output side of said compressor and including serially connected said first duct means, a second combustion chamber and an external load turbine discharging into an ambient air; said compressor supplying compressed gases to the first and second combustion chambers; said mixing valve having a duct connected to said cooler for receiving all exhaust gases from said compressor turbine through said cooler; a fresh air intake duct connected to said mixing valve, and control means connected to said mixing valve for regulating the amount of fresh air entering said mixing valve, said control means opening said valve to an atmospheric pressure for making said external load turbine deliver its rated power, and said means partially closing said valve for making said external load turbine deliver only a portion of its rated power by creating a partial vacuum on the input side of said compressor at part load and no load operation of said power plant.

2. The cyclic circuit as defined in claim 1 which also includes a fuel control system for said first combustion chamber for maintaining constant a heat drop of gases flowing through said compressor turbine irrespective of the magnitude of the external load connected to said external load turbine.

3. The cyclic circuit as defined in claim 1 which also includes a fuel control system for said first combustion chamber for maintaining constant the temperature of gases leaving said first combustion chamber irrespective of the magnitude of external load connected to said external load turbine.

4. The cyclic circuit as defined in claim 1 which also includes a fuel control system for said second combustion chamber for maintaining constant the temperature of gases leaving said second combustion chamber as the external load connected to said external load turbine varies from full load to a part load.

5. The cyclic circuit as defined in claim 1 which also includes a fuel control system for said second combustion chamber for maintaining constant the heat drop of gases flowing through said external load turbine irrespective of the magnitude of the external load connected to the external load turbine for obtaining constant speed operation of said external load turbine.

6. The cyclic circuit as defined in claim 1 which also includes a by-pass valve connected to said first duct means, said by-pass valve having means for opening said first duct to an ambient air and atmospheric pressure when said external load turbine carries no load.

7. A gas turbine power plant comprising dynamic compressor means having an input side and an output side; gas heating means connected in series with the output side of said compressor means; first and second parallel circuits fluid-dynamically connected to said gas heating means; said first circuit including a compressor turbine receiving compressed and heated gases from said gas heating means, a cooler connected to the output side of said compressor turbine, a duct connecting the output side of said cooler to the input side of said compressor means, and an aspirator valve connected through said duct to the input side of said compressor means on one side and an ambient air on the other side; said second parallel circuit including at least a load turbine having an input side receiving compressed and heated gases from said gas heating means, and an output side discharging exhaust gases into ambient air; and control means connected to said aspirator valve to regulate the admission of ambient air to said compressor means and said gas turbine power plant as a function of the magnitude of an external load connected to said load turbine, whereby the input side of said compressor means and the output side of said compressor turbine operate at substantially atmospheric pressure at full external load and progressively decreasing sub-atmospheric pressure with the decrease in said external load.

8. The gas turbine power plant as defined in claim 7 in which said control means connected to the aspirator valve is constructed and arranged fully to open said aspirator valve when said load turbine is operating at full external load, making the pressure on the input side of the compressor means only slightly lower than the atmospheric pressure, and gradually and progressively to close said aspirator valve with the reduction in said external load making the pressure on the input side of said compressor means gradually and progressively lower than the atmospheric pressure, making said compressor turbine discharge into said progressively decreasing sub-atmospheric pressure with the decrease in said external load.

9. The gas turbine power plant as defined in claim 7 in which said combustion chamber means includes a first combustion chamber connected in series with said first parallel circuit between the output side of said compressor means and the input side of said compressor turbine, and a second combustion chamber connected in series with the second parallel circuit between the output side of said compressor means and the input side of said load turbine; the weight-flow $G_C$ of gases leaving the compressor means dividing into two parallel weight-flows $G_{C.T.}$ and $G_{L.T.}$ flowing through the first and second parallel circuits, respectively; the division of said weight-flows $G_{C.T.}$ and $G_{L.T.}$ and their ratio $G_{C.T.}/G_{L.T.}$ being approximately a function of the square root of the temperature ration $T_{L.T.}/T_{C.T.}$, where $T_{L.T.}$ is the temperature of gases entering the load turbine, and $T_{C.T.}$ is the temperature of gases entering the compressor turbine.

10. The gas turbine power plant as defined in claim 7 in which said combustion chamber means includes a first combustion chamber connected in series with the first parallel circuit between said compressor means and said compressor turbine, and a second combustion chamber connected in series with the second parallel circuit between said compressor means and said load turbine; a first control system for said first combustion chamber for reducing the temperature of gases entering said compressor turbine as a function of the reduction in the external load connected to said load turbine; and a second control system regulating the amount of fuel reaching the second combustion chamber to maintain constant the temperature of gases entering the load turbine; the heat drop through the load turbine decreasing with the decrease in the external load connected to said load turbine, and the heat drop through the compressor turbine remaining substantially constant because of the progressively decreasing pressure on the output side of said compressor turbine, whereby said compressor turbine operates at a substantially constant speed and said load turbine operates at a progressively decreasing speed with the decrease in said external load.

11. The gas turbine power plant as defined in claim 7 in which said combustion chamber means includes a first combustion chamber connected in series with the first parallel circuit between said compressor means and said compressor turbine, and a second combustion chamber connected in series with the second parallel circuit between said compressor means and said load turbine; a first control system for said first combustion chamber for reducing the temperature of gases entering said compressor turbine as a function of the reduction in the external load connected to said load turbine; and a second control system regulating the amount of fuel reaching the second combustion chamber gradually and progressively to increase the temperature of gases, entering the load turbine, with the decrease in the external load, said last-recited temperature being minimum at a full external load and maximum at a minimum external load, the increase in said last-recited temperature with the decrease in load being such as to maintain the heat drop through the load turbine constant for operating said load turbine at constant speed.

12. A gas turbine power plant including compressor means having input and output sides, a combustion chamber connected to the output side of said compressor means for receiving compressed gases from said compressor means, a compressor turbine connected to the output side of said combustion chamber for receiving compressed and heated gases from said combustion chamber, a cooler connected to said compressor turbine for receiving exhaust gases from said compressor turbine, first duct interconnecting the output side of said cooler and the input side of said compressor means for conveying exhaust gases from said compressor turbine to said compressor means, a fresh air duct having one end opening into an ambient air and the other end into said first duct, an aspirator valve connected in series with said second duct for regulating the amount of fresh air flowing through said second duct and into said first duct for replenishing fresh air required by said power plant, control means for said aspirator valve to control a total weight-flow of gases through said power plant and to control the pressure of gases reaching the input side of said compressor means between substantially atmospheric pressure at full external load delivered by said power plant, and progressively decreasing sub-atmospheric pressure with the decreasing external load, said compressor turbine discharging into a progressively more negative, sub-atmospheric pressure with the decrease in said external load.

13. The gas turbine power plant as defined in claim 12 which includes a load turbine connected to said combustion chamber for receiving hot gases from said combustion chamber, an exhaust duct connected to the exhaust side of said load turbine and opening into an ambient air, a source of fuel connected to said combustion chamber, and a control system for said combustion chamber and said source of fuel for decreasing the amount of fuel reaching said chamber with the decrease in the external load connected to said load turbine, said load turbine operating at a progressively decreasing heat drop through the load turbine because of the exhaust of said load turbine into an ambient air, and said compressor turbine operating at a substantially constant heat drop through said compressor turbine because of the discharge of the exhaust gases of said compressor turbine into a progressively lower, sub-atmospheric pressure on the input side of said compressor means.

14. The method of producing useful energy with the aid of a thermodynamic cycle, said method including the steps of dynamically compressing a weight-flow $G_C$ composed of air and cooled exhaust gases produced after the expansion of the products of combustion of a fuel in said air, dividing said weight-flow $G_C$ into first and second flows having respective weight-flows $G_{T.T.}$ and $G_{L.T.}$, burning fuel in weight flow $G_{C.T.}$ and the expanding the first product of combustion of $G_{C.T.}$ to a sub-atmospheric pressure for operating said cycle, burning fuel in said weight flow $G_{L.T.}$ for obtaining the product of combustion $G'_{L.T.}$ and then expanding to an atmospheric pressure the weight-flow $G'_{L.T.}$ for obtaining useful power from said cycle, returning said entire weight-flow $G'_{C.T.}$ back to the compressing step of said cycle, continuously regulating the amount of fresh air admitted to the compressing step of said cycle for regulating the amount of available useful power produced by said cycle and thereby continuously regulating said sub-atmospheric pressure between that approaching atmospheric pressure at maximum useful power and a small fraction of said atmospheric pressure at minimum useful power, and simultaneously also regulating the maximum temperatures $T_{C.T.}$ and $T_{L.T.}$ of the respective weight-flows $G'_{C.T.}$ and $G'_{L.T.}$ for regulating the amount of useful power produced by said cycle.

15. The method as defined in claim 14 which includes the following additional steps of reducing the useful power produced by said cycle; progressively decreasing the amount of fresh air admitted to the compression step of said cycle; simultaneously and progressively reducing the temperature $T_{C.T.}$ of said weight-flow $G'_{C.T.}$, while maintaining substantially constant the heat drop $\Delta H_{C.T.}$ through the expansion step of said weight-flow $G'_{C.T.}$ by simultaneously and progressively decreasing said sub-atmospheric pressure; maintaining the temperature $T_{L.T.}$ constant; and progressively reducing the heat drop through said weight-flow $G'_{L.T.}$ by reducing the pressure produced by $G_C$ upon its compression.

16. The method as defined in claim 14 which includes the following additional steps for reducing the useful power produced by said cycle: of progressively decreasing the amount of fresh air admitted to the compression step of said cycle, simultaneously and progressively reducing the temperature $T_{C.T.}$ of said weight-flow $G'_{C.T.}$, while maintaining substantially constant the heat drop $\Delta H_{C.T.}$ through the expansion step of said weight-flow $G'_{C.T.}$ by simultaneously and progressively decreasing said sub-atmospheric pressure; increasing the temperature $T_{L.T.}$ from its minimum value at the maximum useful power obtainable from said cycle to its maximum value at the minimum power obtainable with said cycle, while maintaining the heat drop of said weight-flow $G'_{L.T.}$ constant.

17. A gas turbine power plant including a first circuit having the following means connected in series: a dynamic compressor, a first combustion chamber, a compressor turbine mechanically and fluid dynamically connected to said compressor through said first combustion chamber for driving said compressor, said compressor turbine receiving heated gases from said first combustion chamber and discharging said heated gases as expanded exhaust gases, and duct means, including a heat exchanger, for conveying said exhaust gases from the exhaust side of said compressor turbine to the input side of said compressor; said heat exchanger having means for cooling said exhaust gases before their entry into said compressor; a fresh air aspirator valve connected in parallel to said series circuit and to said duct means on the compressor side of said duct means for admitting controllable amount of ambient air into said duct means and then into said compressor; and a control system including a connection to said aspirator valve for controlling the degree of opening and closing of said aspirator valve for varying the amount of fresh air admitted to said power plant through said aspirator valve as a function of an external load connected to said power plant; said aspirator valve, with the aid of its control system, also varying the pressure of gases, flowing through said duct means at the entry into said compressor, between that approaching an atmospheric pressure at full external load and a progressively lower sub-atmospheric pressure as the external load decreases from full load to no load.

18. The circuit as defined in claim 17 which also includes a second circuit connected in parallel with said first circuit and having on its input side a second combustion chamber connected to the output side of said compressor, an external load turbine connected to and normally receiving hot gases from said second combustion chamber, a source of fuel and a fuel line connecting said combustion chamber to said source of fuel, a fuel valve connected to said fuel line, and control means for regulating said fuel valve so as to maintain constant the heat drop $\Delta H_{L.T.}$ through said external load turbine irrespective of the magnitude of the external load connected to said external load turbine.

19. The power plant as defined in claim 17, which also includes a second series circuit including, a second combustion chamber connected to the output side of said compressor, a load turbine connected to the output side of said second combustion chamber, a source of fuel connected to said combustion chamber, a fuel control valve connected in series with a line inter-connecting said source and said combustion chamber, and control means for said valve for maintaining constant the temperature of gases reaching said load turbine through the operating range of said power plant, except the idling condition of said power plant.

20. A power plant having a first series circuit including a compressor, a first heat exchanger having low and high heat sides, said compressor discharging into the low side of said first heat exchanger, a first combustion chamber receiving heated gases from the low side of said heat exchanger, a compressor turbine, a cooler receiving exhaust gases from said compressor turbine, and duct means connecting the downstream side of said cooler to the input side of said compressor, said duct means also including an aspirator valve connecting said duct and the input side of said compressor to ambient air, and means for controlling the degree of opening of said aspirator valve for varying the amount of fresh air entering said power plant; and a second circuit including a second heat exchanger having low and high heat sides, a second combustion chamber and a load turbine discharging its exhaust gases into ambient air through the high heat side of said second heat exchanger, said second circuit receiving compressed gases from said compressor through the low temperature side of said second heat exchanger.

21. The gas turbine power plant as defined in claim 10 which includes a common regulating means for simultaneously actuating the control means connected to said aspirator valve and said first control system, said common regulating means simultaneously and progressively reducing the amount of fuel reaching said first combustion chamber and progressively closing said aspirator valve with the progressive decrease in the external load for progressively reducing the weight flow and the pressure of gases on the input side of said compressor means, said pressure being varied between that approaching atmospheric pressure at full load and progressively lower sub-atmospheric pressure with the decrease in load, whereby said compressor turbine discharges into the progressively lower sub-atmospheric pressure with the decrease in the external load.

References Cited in the file of this patent

UNITED STATES PATENTS

| | | |
|---|---|---|
| 1,852,569 | Hobbs | Apr. 5, 1932 |
| 2,131,781 | Lysholm | Oct. 4, 1938 |
| 2,502,878 | Newcombe | Apr. 4, 1950 |
| 2,505,796 | Sedille | May 2, 1950 |
| 2,541,532 | Mosser | Feb. 13, 1951 |
| 2,543,677 | Traupel | Feb. 27, 1951 |
| 2,547,093 | Ray | Apr. 3, 1951 |

FOREIGN PATENTS

| | | |
|---|---|---|
| 6,317 | Great Britain | Mar. 15, 1904 |
| 24,591 | Great Britain | Nov. 12, 1904 |